US010296459B1

United States Patent
Jayasimha et al.

(10) Patent No.: US 10,296,459 B1
(45) Date of Patent: May 21, 2019

(54) REMOTE ATOMIC OPERATIONS IN MULTI-SOCKET SYSTEMS

(71) Applicant: Intel Corporation, Santa Clara, CA (US)

(72) Inventors: Doddaballapur N. Jayasimha, Saratoga, CA (US); Samantika S. Sury, Westford, MA (US); Christopher J. Hughes, Santa Clara, CA (US); Jonas Svennebring, Sollentuna (SE); Yen-Cheng Liu, Portland, OR (US); Stephen R. Van Doren, Portland, OR (US); David A. Koufaty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/858,894

(22) Filed: Dec. 29, 2017

(51) Int. Cl.
    *G06F 12/0831* (2016.01)
    *G06F 12/0815* (2016.01)
    *G06F 12/0808* (2016.01)
    *G06F 9/30* (2018.01)

(52) U.S. Cl.
    CPC ...... *G06F 12/0815* (2013.01); *G06F 9/30047* (2013.01); *G06F 12/0808* (2013.01); *G06F 12/0831* (2013.01); *G06F 2212/1008* (2013.01); *G06F 2212/1021* (2013.01); *G06F 2212/608* (2013.01)

(58) Field of Classification Search
None
See application file for complete search history.

(56) References Cited

U.S. PATENT DOCUMENTS

| 9,092,345 | B2 * | 7/2015 | Nystad | G06F 12/0815 |
| 2015/0046655 | A1 * | 2/2015 | Nystad | G06F 12/0815 |
| | | | | 711/125 |

* cited by examiner

*Primary Examiner* — Brian R Peugh
(74) *Attorney, Agent, or Firm* — Nicholson de Vos Webster & Elliott, LLP

(57) ABSTRACT

Disclosed embodiments relate to remote atomic operations (RAO) in multi-socket systems. In one example, a method, performed by a cache control circuit of a requester socket, includes: receiving the RAO instruction from the requester CPU core, determining a home agent in a home socket for the addressed cache line, providing a request for ownership (RFO) of the addressed cache line to the home agent, waiting for the home agent to either invalidate and retrieve a latest copy of the addressed cache line from a cache, or to fetch the addressed cache line from memory, receiving an acknowledgement and the addressed cache line, executing the RAO instruction on the received cache line atomically, subsequently receiving multiple local RAO instructions to the addressed cache line from one or more requester CPU cores, and executing the multiple local RAO instructions on the received cache line independently of the home agent.

25 Claims, 28 Drawing Sheets

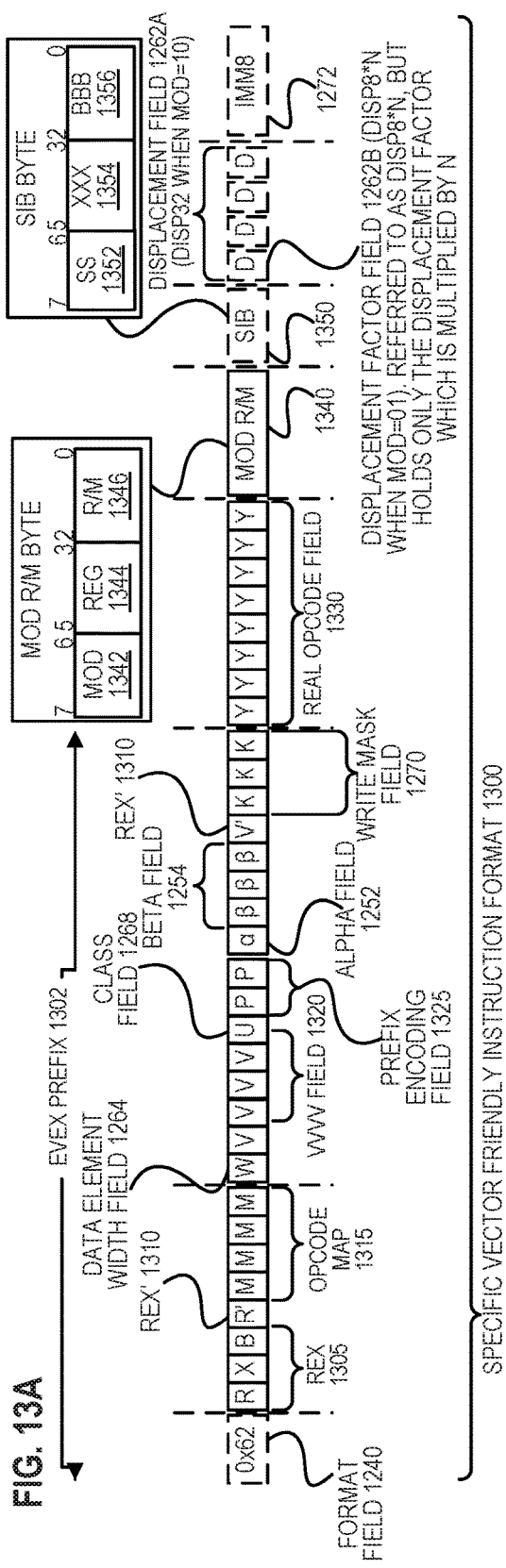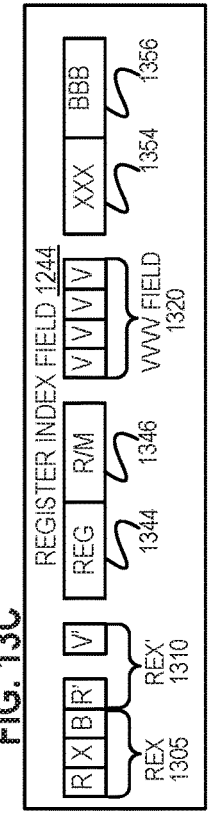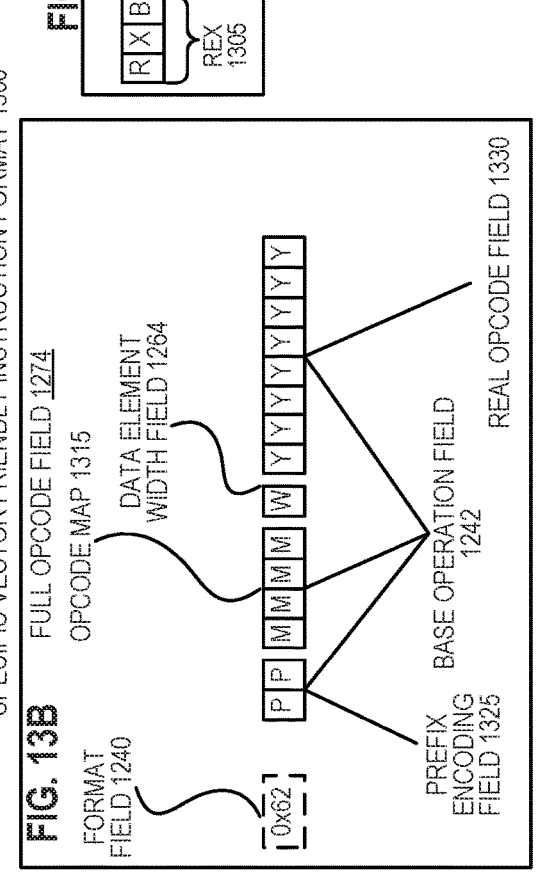

FIG. 14
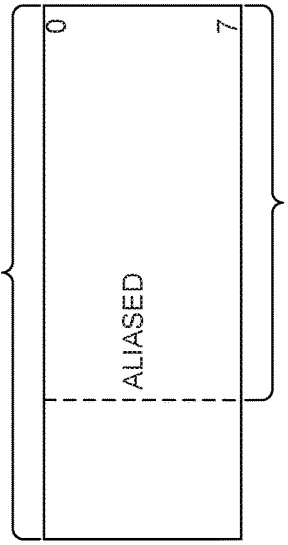
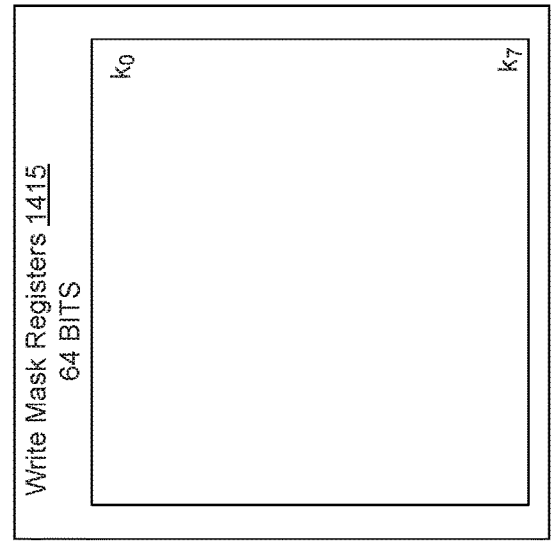
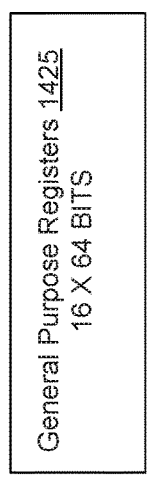
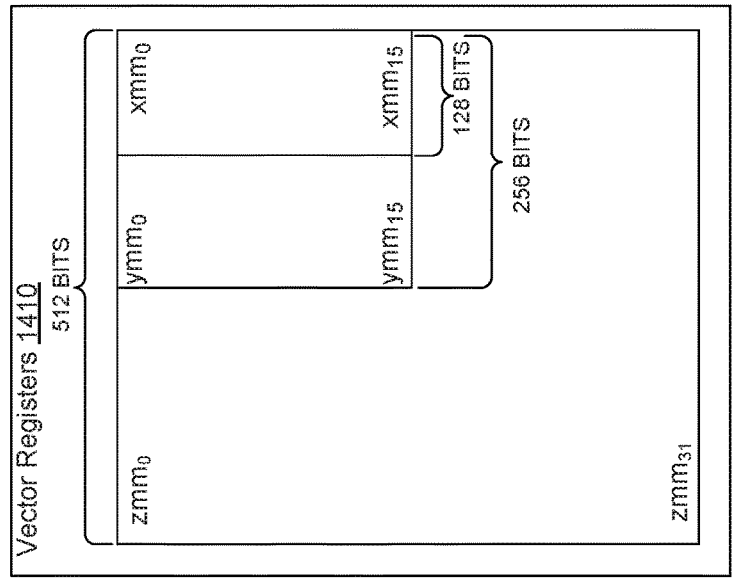

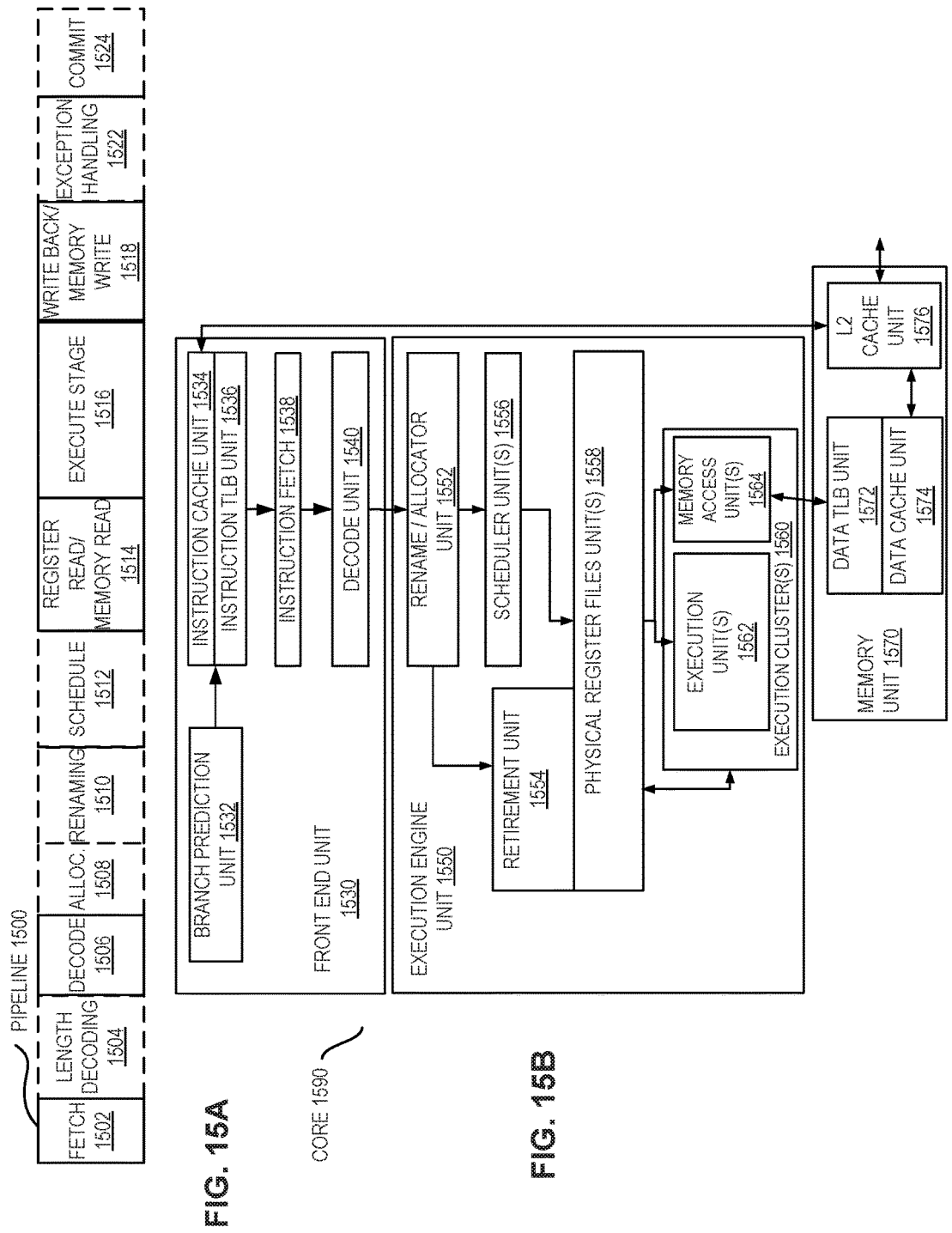

REMOTE ATOMIC OPERATIONS IN MULTI-SOCKET SYSTEMS

FIELD OF INVENTION

The field of invention relates generally to computer processor architecture, and, more specifically, to remote atomic operations in multi-socket systems.

BACKGROUND

An atomic memory operation is one during which a processor core can read a location, modify it, and write it back in what appears to other cores as a single bus operation. An atomic memory operation in a multi-core system is one that cannot be divided into any smaller parts, or appears to other cores in the system to be a single operation. Read-modify-write is one of a class of atomic memory operations that both reads a memory location and writes a new value into it as part of the same operation, at least as it appears to other cores in the multi-core system. Atomic operations are prevalent in a diverse set of applications, including packet processing, high-performance computing, and machine learning, and, more generically, in dynamic scheduling algorithms, to name a few.

One or more central processing unit (CPU) cores can exist within a processor, which can occupy one of multiple sockets in a multi-socket system.

Execution of atomic operations can suffer inefficiencies, especially with contention for a same memory address among multiple sockets in a multi-socket system.

BRIEF DESCRIPTION OF THE DRAWINGS

The present invention is illustrated by way of example and not limitation in the figures of the accompanying drawings, in which like references indicate similar elements and in which:

FIG. 12A is a block diagram illustrating a generic vector friendly instruction format and class A instruction templates thereof according to embodiments of the invention;

FIG. 12B is a block diagram illustrating the generic vector friendly instruction format and class B instruction templates thereof according to embodiments of the invention;

FIG. 13A is a block diagram illustrating an exemplary specific vector friendly instruction format according to embodiments of the invention;

FIG. 13B is a block diagram illustrating the fields of the specific vector friendly instruction format that make up the full opcode field according to one embodiment of the invention;

FIG. 13C is a block diagram illustrating the fields of the specific vector friendly instruction format that make up the register index field according to one embodiment of the invention;

FIG. 14 is a block diagram of a register architecture according to one embodiment of the invention;

FIG. 15A is a block diagram illustrating both an exemplary in-order pipeline and an exemplary register renaming, out-of-order issue/execution pipeline according to embodiments of the invention;

FIG. 15B is a block diagram illustrating both an exemplary embodiment of an in-order architecture core and an exemplary register renaming, out-of-order issue/execution architecture core to be included in a processor according to embodiments of the invention;

FIG. 16A is a block diagram of a single processor core, along with its connection to the on-die interconnect network and with its local subset of the Level 2 (L2) cache, according to embodiments of the invention;

FIG. 16B is an expanded view of part of the processor core in FIG. 16A according to embodiments of the invention;

FIG. 18 shown a block diagram of a system in accordance with one embodiment of the present invention;

FIG. 19 is a block diagram of a first more specific exemplary system in accordance with an embodiment of the present invention;

FIG. 20 is a block diagram of a second more specific exemplary system in accordance with an embodiment of the present invention;

FIG. 21 is a block diagram of a System-on-a-Chip (SoC) in accordance with an embodiment of the present invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description, methods, configurations, and related apparatuses are disclosed for the processing of remote atomic operation (RAO) instructions in a multi-socket environment. Supported RAO instructions each perform an atomic update operation (e.g., read-modify-write) on a memory location.

In some embodiments, multiple processors in a multi-socket system are plugged into sockets, which are physical connectors on a printed circuit board that mechanically and electrically couple the processors to the rest of the system. In some embodiments, processors use a pin grid array (PGA), where pins on the underside of the processor package plug into holes on the socket and electrically couple the processor to the system. Some processor manufacturers define and fabricate sockets customized for use with their processors, specifying characteristics such as a number of pins, an insertion force strength, voltage levels, and clocks. In some embodiments, the multiple sockets in the multi-socket system are electrically connected via one or more links in an interconnect network, such that RAO request and response transaction flows traverse one or more links along the interconnect network. The multiple sockets in a multi-socket system communicate transactions across one or more links interconnecting the sockets.

In some embodiments, multiple processors in a multi-processor system are electrically coupled to the system, but do not plug into a socket. For example, processors having a ball grid array (BGA) interrace can be soldered onto a motherboard. Such embodiments using surface-mount processors operate in the same way as multi-socket systems described herein.

Figure 1A:
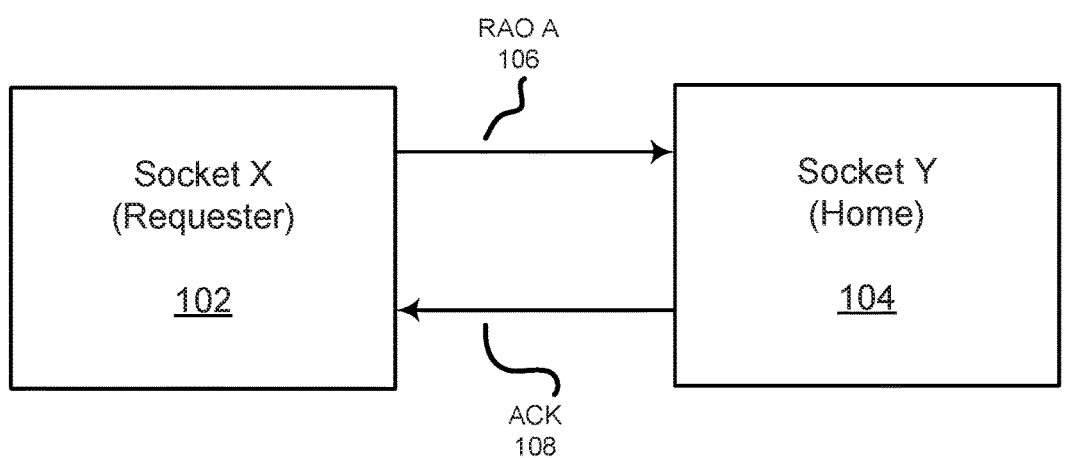
FIG. 1A is a block flow diagram of a multi-socket system to execute an instruction for a remote atomic operation, according to some embodiments.
Figure 2A:
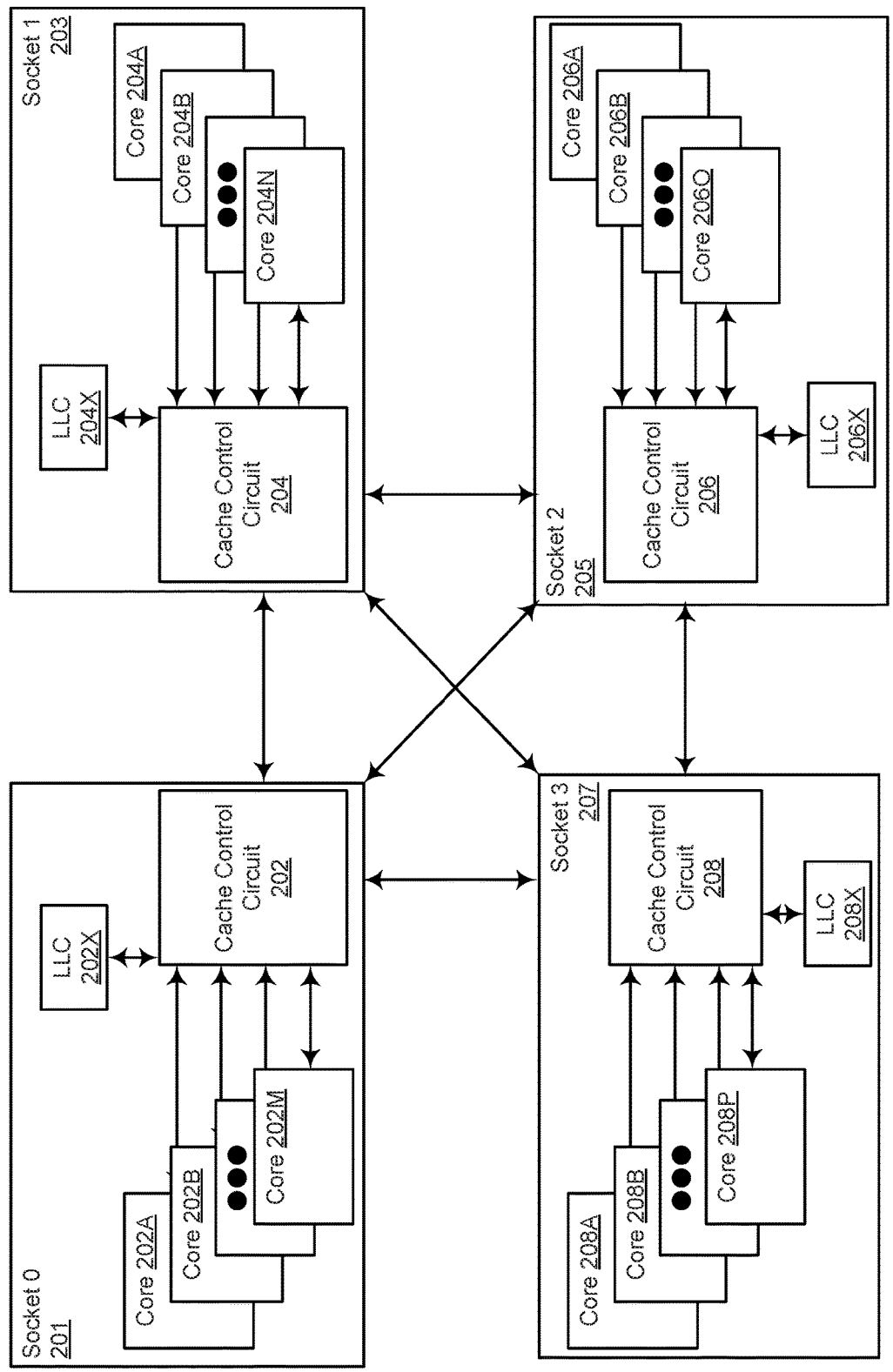
FIG. 2A is a block diagram illustrating a multi-socket system for executing a remote atomic operation instruction, according to some embodiments.
Figure 2B:
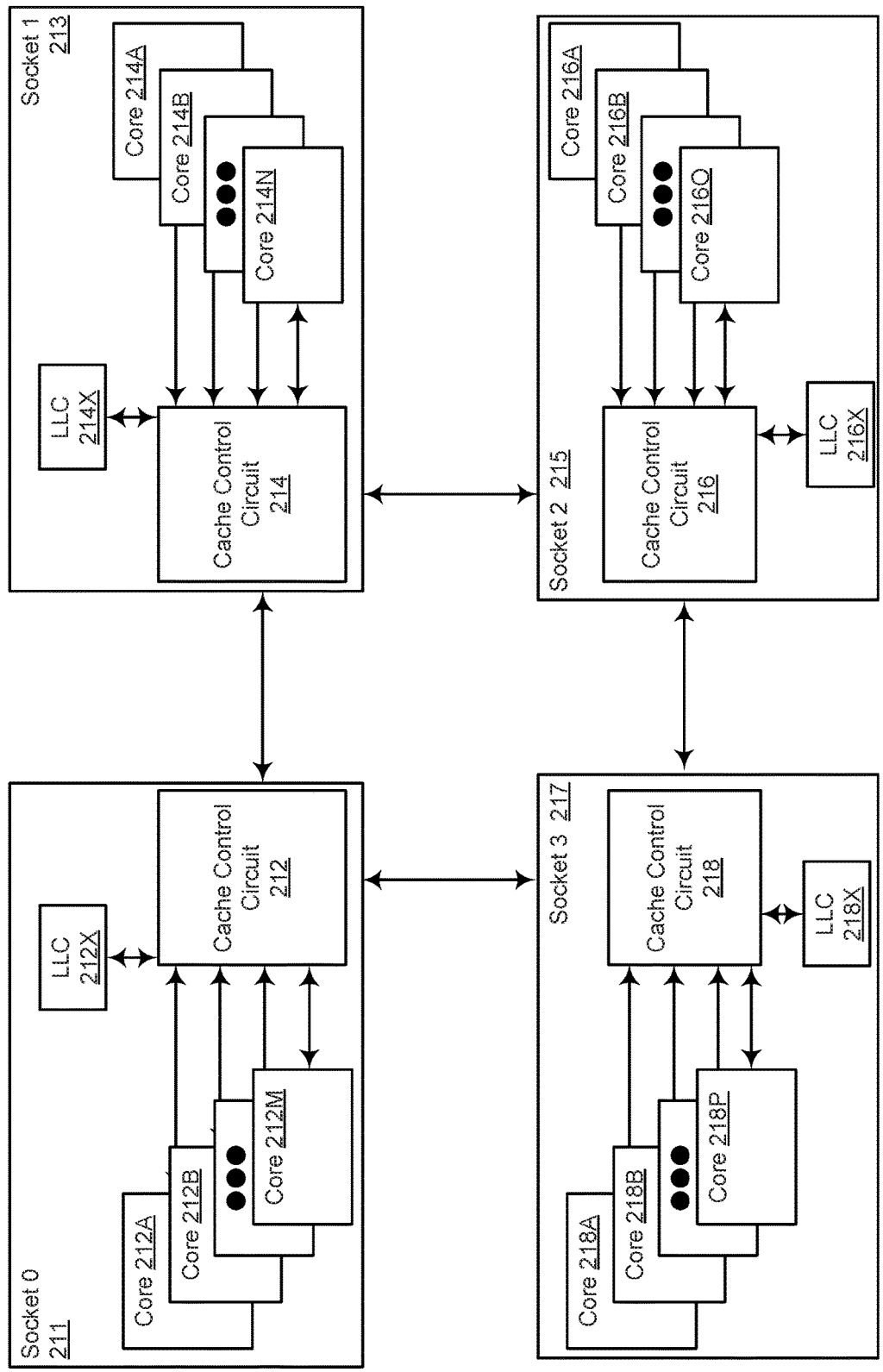
FIG. 2B is a block diagram illustrating a multi-socket system for executing a remote atomic operation instruction, according to some embodiments.
Figure 2C:
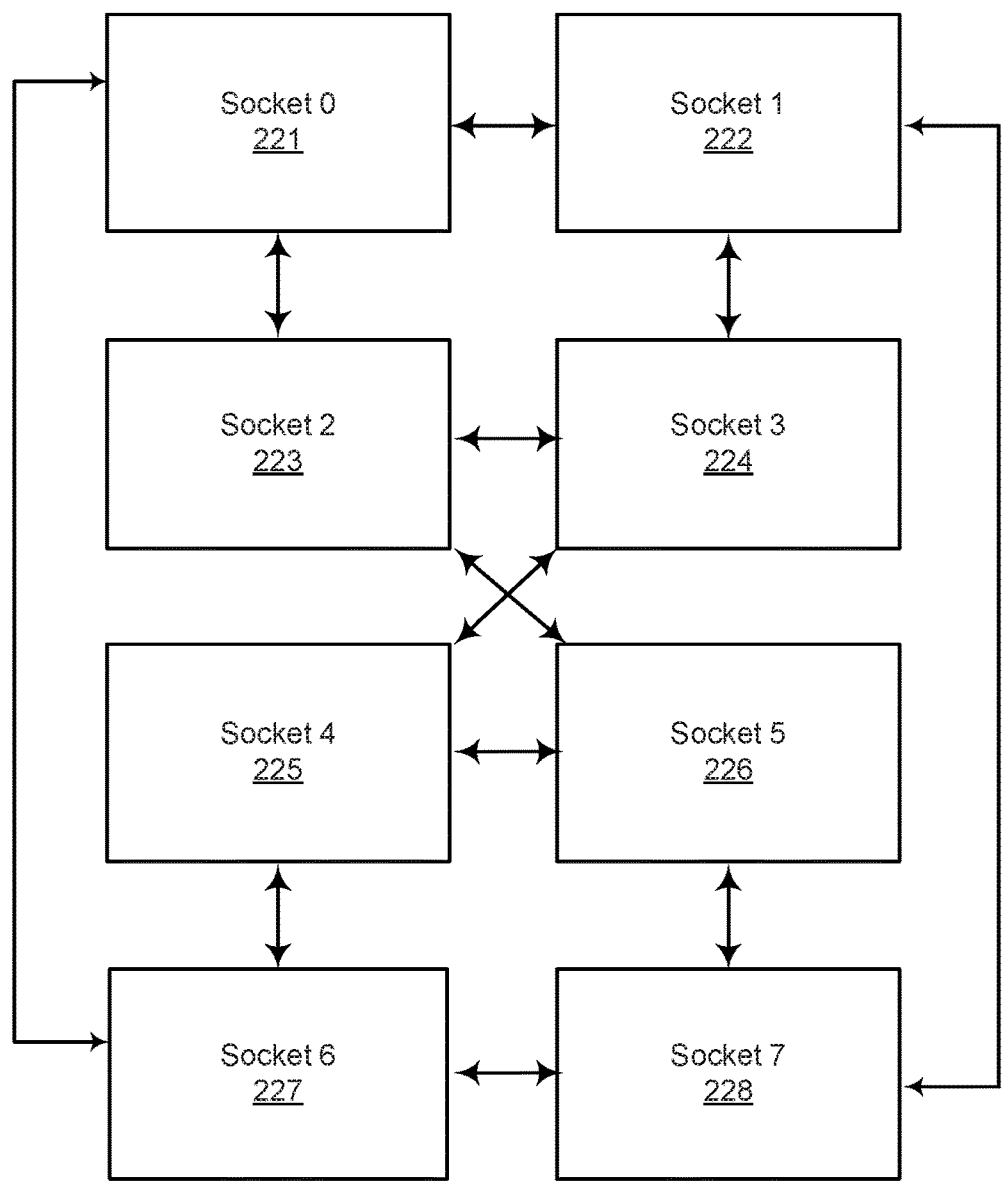
FIG. 2C is a block diagram illustrating processing a received remote atomic operation instruction, according to some embodiments.

Some disclosed embodiments process RAO instructions in multi-socket systems by exporting RAO transactions across the multi-socket cache coherency protocol to the home caching agent or the home memory controller. FIG. 1A illustrates an embodiment supporting RAO instructions in a multi-socket system in which socket (Requester) X 102 (the requester socket) wishes to execute an RAO instruction to a memory address A, which lies in in a logical memory partition mapped to Socket Y (Home) 104. Socket Y (Home) 104 is thus the designated "home" for accesses to that logical memory range. Socket X (Requester) 102 determines that Socket Y (Home) 104 is the designated home agent, and at 106 provides an RAO instruction to Socket Y (Home) 104, over an interface that is mapped to use a multi-socket cache coherency protocol. It should be noted that the traversal from one socket to another, as illustrated by arrows 106 and 108, is accomplished through one or more hops utilizing one or more links of the interconnect paths of the multi-socket architecture. A few examples of the interconnectivity are illustrated in FIG. 2A, FIG. 2B, and FIG. 2C.

Socket Y (Home) 104 then accesses the addressed cache line, either in its cache hierarchy or from physical memory, performs the RAO operation on the addressed data, and acknowledges completions by providing an ACK back to the Socket X (Requester) 102 at 108. However, the embodiment illustrated in FIG. 1A requires the system's multi-socket cache coherency protocol to understand and handle RAO instructions. Furthermore, in scenarios when Socket X (Requester) 102 issues multiple RAO instructions to address A, providing an RAO to Socket Y (Home) 104 and waiting for an acknowledgement from Socket Y (Home) 104 for each one can incur overhead and a resulting performance degradation in Socket X and in the entire multi-socket system.

Some disclosed embodiments process RAO instructions that map to a home agent in a remote socket by bringing the data and ownership into the requesting socket's distributed shared cache control circuit as if it were a regular atomic operation but once it is in the shared cache control circuit, operate on it in place at the local socket's cache control circuit itself. This approach offers an advantage of keeping a cache line in place at the cache of the cache control circuit through multiple RAO operations from different cores on the same socket, while not having to export the transactions across the interconnect to the remote home agent (exporting transactions has performance implications by increasing latency of these transactions and consuming interconnect bandwidth). In other words, some disclosed embodiments perform RAO updates at the requesting socket cache control circuits. Thus, some disclosed embodiments treat a remote atomic operation as a local atomic operation when it crosses the socket boundary, bring the data into the local socket's cache control circuit, and then execute it at the local cache control circuit as if it were a remote atomic operation that mapped to the local socket.

Figure 1B:
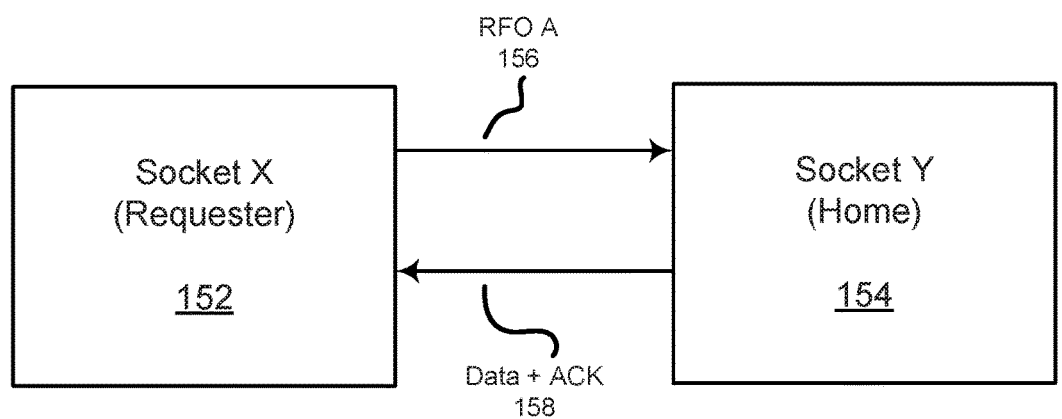
FIG. 1B is a block flow diagram of a multi-socket system to execute an instruction for a remote atomic operation, according to some embodiments.

While the core that performs an RAO to a remote socket still has to suffer a cross-socket latency to fetch the data into its own cache control circuit, subsequent RAOs from the same socket can hit in the cache control circuit and execute the RAOs there with high throughput and low latency. FIG. 1B is a block flow diagram of a multi-socket system to execute an instruction for a remote atomic operation, according to some embodiments. As shown, Socket X (Requester) 152 provides a request for ownership (RFO) to address A at 156 to get the addressed cache line and its ownership using the multi-socket system's existing cache coherency protocol. It should be noted that RAO transactions traverse from one socket to another, as illustrated by arrows 156 and 158, using one or more hops along one or more links of the interconnect paths of the multi-socket architecture. At 158, Socket Y (Home) 154 provides the requested cache line and an acknowledgement to Socket X (Requester) 152, which then can perform multiple RAO instructions to the cache line without involving Socket Y (Home) 154. Many parallel programs co-locate contending threads on the same socket, at least temporarily. By bringing the cache line and its ownership to the requester socket, the embodiment of FIG. 1B avoids unnecessary cross-socket transactions.

Disclosed embodiments favor the execution of RAO instructions from the local socket, yet provide a fairness and anti-starvation mechanism (as described in the section entitled "Preventing Starvation of Requests from Remote Sockets") that would allow the forward progress of RAO instructions from other sockets under contention. In some embodiments, other sockets attempt to gain ownership of a cache line using a request for ownership (RFO) transaction according to the cache coherency protocol. In some embodiments, other sockets' RFO requests generated as a result of RAO instructions are differentiated from, and treated differently from, other RFO requests.

Disclosed embodiments are expected to improve the performance of RAO operations, especially for systems with large core counts and networking applications such as packet processing. Disclosed embodiments also are expected to enhance the performance of remote atomic operations in dual-socket systems, quad-socket systems, and larger count multi-socket systems, which are growing in popularity. The flow of these operations is illustrated and described further below, including with respect to FIGS. 7-10.

FIG. 2A is a block diagram illustrating a multi-socket system for executing a remote atomic operation instruction, according to some embodiments. As shown, the multi-socket system includes socket 0 201, which includes cores 202A-M, last-level cache (LLC) 202X, and cache control circuit 202; socket 1 203, which includes cores 204A-N, last-level cache (LLC) 204X, and cache control circuit 204; socket 2 205, which includes cores 206A-O, last-level cache (LLC) 206X, and cache control circuit 206; and socket 3 207, which includes cores 208A-P, last-level cache (LLC) 208X, and cache control circuit 208. RAO transactions traverse from one socket to another using one or more hops utilizing one or more links of the interconnect of the multi-socket architecture.

It should be noted that cache control circuits 202, 204, 206, and 208 are logical representations of cache control circuitry, such as CHA 414 (FIG. 4), which includes several physical components. Similarly, last level caches 202X, 204X, 206X, and 208X are logical representations of last level cache circuitry that has multiple components and circuitry, potentially divided into partitions.

As illustrated, sockets 0-3 are connected in a cross-bar configuration, allowing direct connections among cache control circuits 202, 204, 206, and 208 in accordance with some embodiments. RAO transactions traverse from one socket to another using one or more hops utilizing one or more links of the interconnect paths of the multi-socket architecture. In some embodiments, the cache control circuit in each of the sockets 0-3 conducts discovery to learn the topology of the system.

In some embodiments, sockets 0-3 are each disposed on a printed circuit board, the sockets being connected in a cross-bar configuration. In some embodiments, two or more processors operating in accordance with embodiments disclosed herein are plugged into the sockets. A multi-socket system as illustrated in FIG. 2A is sometimes referred to as a multi-processor system. A multi-socket system including two sockets is sometimes referred to as a dual-socket system.

Multi-socket systems for executing remote atomic operations according to embodiments disclosed herein are further illustrated and discussed below with respect to FIGS. 18-22.

FIG. 2B is a block diagram illustrating a multi-socket system for executing a remote atomic operation instruction, according to some embodiments. As shown, the multi-socket system includes socket 0 211, which includes cores 212A-M, last-level cache (LLC) 212X, and cache control circuit 212; socket 1 213, which includes cores 214A-N, last-level cache (LLC) 214X, and cache control circuit 214; socket 2 215, which includes cores 216A-O, last-level cache (LLC) 216X, and cache control circuit 216; and socket 3 217, which includes cores 218A-P, last-level cache (LLC) 218X, and cache control circuit 218. RAO transactions traverse from one socket to another using one or more hops utilizing one or more links of the interconnect paths of the multi-socket architecture.

It should be noted that cache control circuits 212, 214, 216, and 218 are logical representations of cache control circuitry, such as CHA 314 (FIG. 4), which includes several physical components. Similarly, last level caches 212X, 214X, 216X, and 218X are logical representations of last level cache circuitry that has multiple components and circuitry, potentially divided into multiple partitions.

As illustrated, sockets 0-3 are connected in a ring configuration, allowing direct connections between each of socket cache control circuits 212, 214, 216, and 218 and their neighboring sockets, in accordance with some embodiments. In some embodiments, the cache control circuit in each of the sockets 0-3 conducts discovery to learn the topology of the system.

In some embodiments, sockets 0-3 are each disposed in a socket on a printed circuit board, the sockets being connected in a ring configuration. In some embodiments, a printed circuit board includes four sockets interconnected in a ring configuration, with two or more sockets having a processor plugged in and operating in accordance with embodiments disclosed herein. A multi-socket system as illustrated in FIG. 2B is sometimes referred to as a multi-processor system. A multi-socket system including four sockets is sometimes referred to as a quad-socket system.

Multi-socket systems for executing remote atomic operations according to embodiments disclosed herein are further illustrated and discussed below with respect to FIGS. 18-22.

FIG. 2C is a block diagram illustrating a multi-socket system for executing a remote atomic operation instruction, according to some embodiments. As shown, the multi-socket system includes multiple sockets, illustrated logically as socket 0 221, socket 1 222, socket 2 223, socket 3 224, socket 4 225, socket 5 226, socket 6 227, and socket 7 228. RAO transactions traverse from one socket to another using one or more hops utilizing one or more links of the interconnect paths of the multi-socket architecture.

As illustrated, sockets 0-7 are connected in a hybrid of a cross-bar connection and a ring configuration, allowing some direct connections and some indirect connections among sockets 0-7 221-228. In particular, each of sockets 0-7 is coupled to exactly three other sockets.

In some embodiments, sockets 0-7 are each disposed on a printed circuit board, and connected in a hybrid of the cross-bar connection and the ring configuration. In some embodiments, a printed circuit board includes eight sockets interconnected as illustrated in FIG. 2C. A multi-socket system as illustrated in FIG. 2C is sometimes referred to as a multi-processor system. A multi-socket system including eight sockets is sometimes referred to as an octa-socket system. In some embodiments, a printed circuit board contains eight or more sockets, with a processor plugged into each of two, three, four, five, six, seven, or more of the sockets.

Multi-socket systems for executing remote atomic operations according to embodiments disclosed herein are further illustrated and discussed below with respect to FIG. 18 to FIG. 22.

Figure 3:
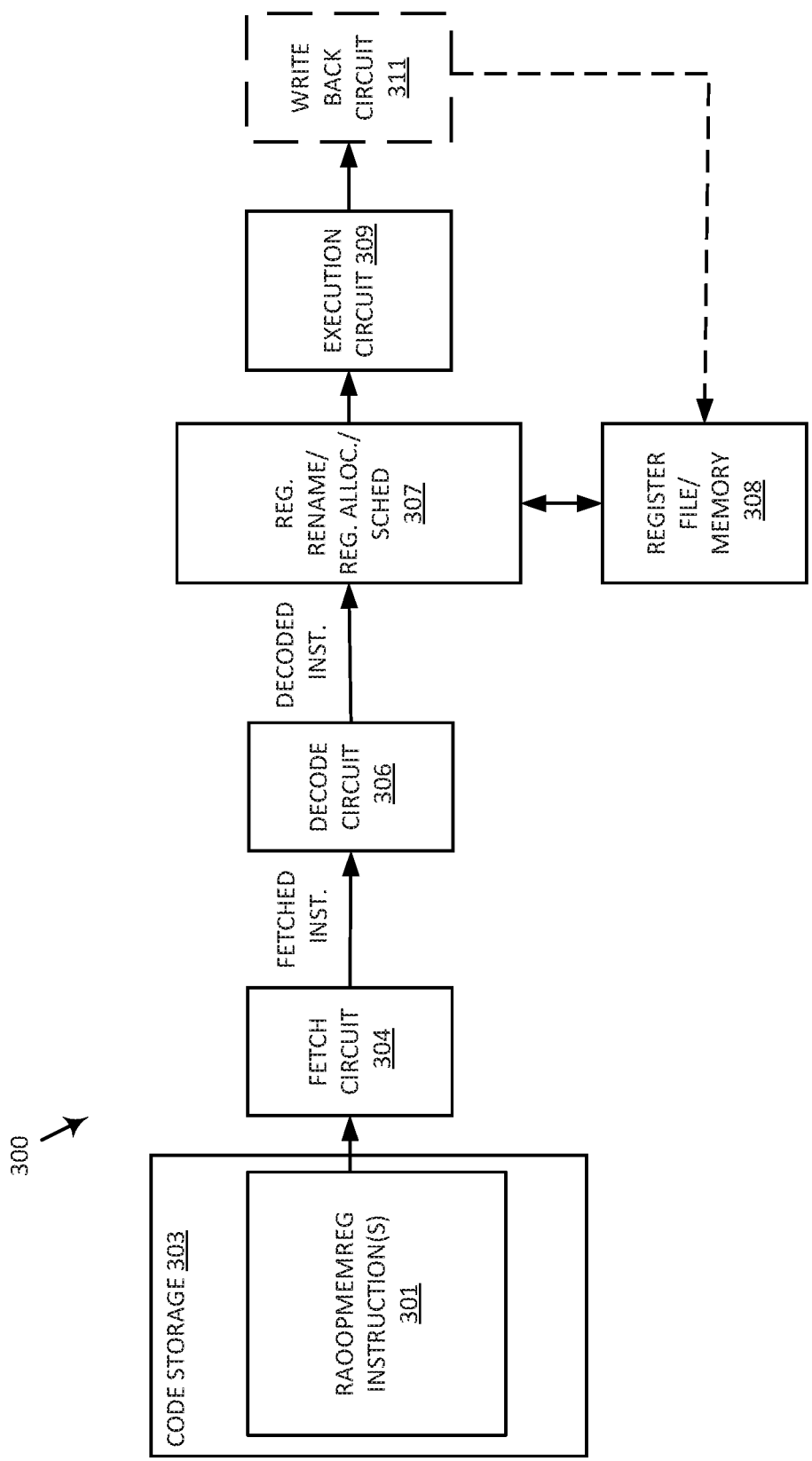
FIG. 3 is a block diagram illustrating processing components for executing instructions for remote atomic operations, according to some embodiments.

FIG. 3 illustrates an embodiment of hardware to process an RAO instruction. As illustrated, code storage 303 stores an RAOOPMEMREG instruction 301 to be executed. The instruction is fetched by fetch circuit 304, then decoded by decode circuit 306. The instruction 301 includes fields for an opcode, a destination memory identifier to specify a memory destination, and, potentially, additional fields and operands as described further below with respect to FIG. 11, FIGS. 12A-B, and FIGS. 13A-D. Decode circuit 306 decodes the instruction into one or more operations. In some embodiments, this decoding includes generating a plurality of micro-operations to be performed by execution circuitry (such as execution circuit 309). The decode circuit 306 also decodes instruction prefixes (if used).

In some embodiments, register renaming, register allocation, and/or scheduling circuit 307 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuit out of an instruction pool (e.g., using a reservation station in some embodiments).

Registers (register file) and/or memory 308 store data as operands of the instruction to be operated on by execution circuitry. Exemplary register types include packed data registers, general purpose registers, and floating point registers.

Execution circuit 309 executes the decoded RAOOPMEMREG instruction. Some embodiments of the execution circuit are shown and described with respect to FIGS. 7-10. Write back circuit 311 commits the result of the execution of the decoded RAOOPMEMREG instruction. Writeback circuit 311 is optional, as indicated by its dashed border, insofar as the RAOOPMEMREG instruction might not be written back, or might be written back at a different time.

Figure 4:
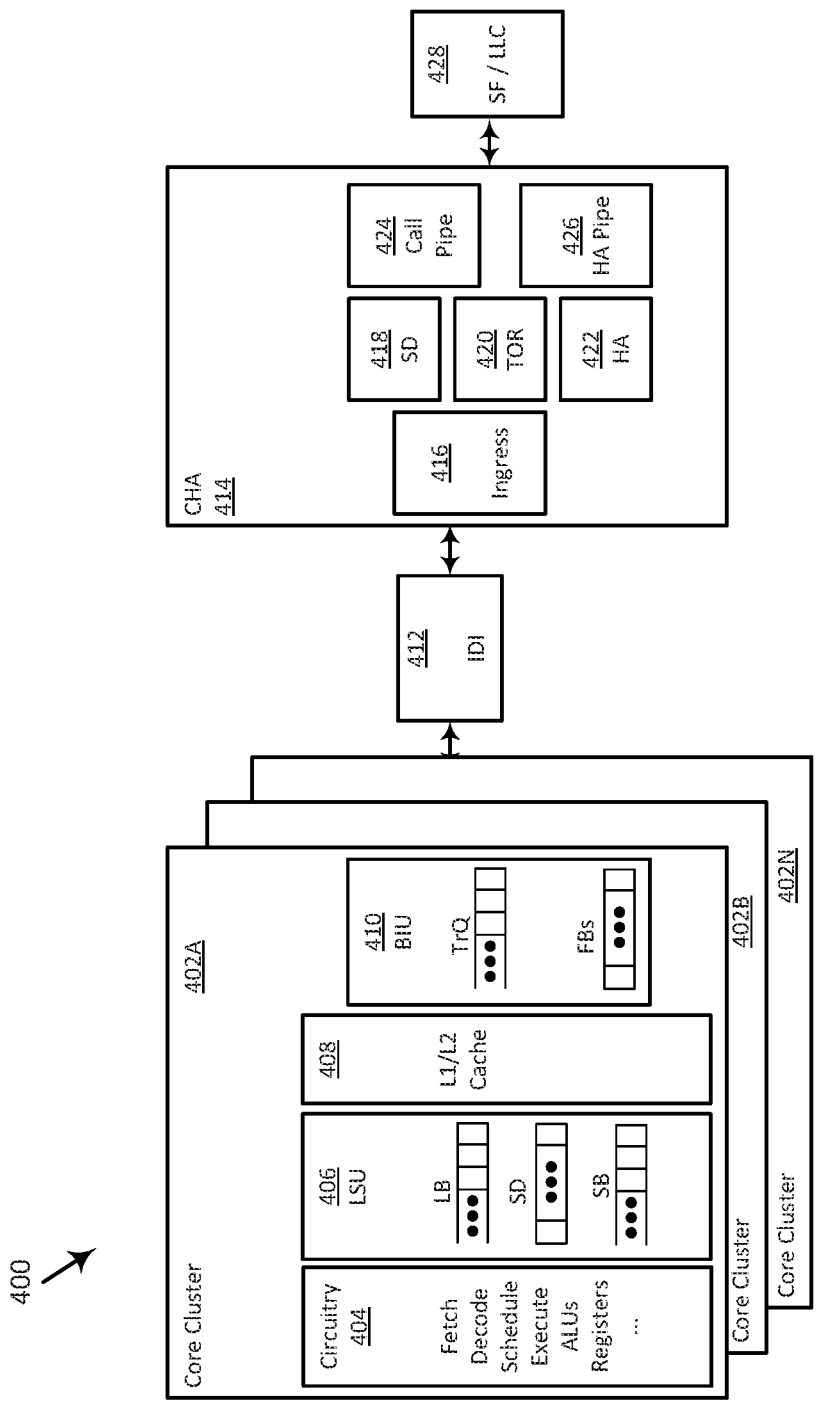
FIG. 4 is a block diagram illustrating portions of a multi-core processor that can be used to perform RAO operations.

FIG. 4 is a block diagram illustrating portions of a multi-core processor that can be used to perform RAO operations. As shown, processor 400 includes core clusters 402A-N, each of which includes circuitry 404, which includes fetch, decode, scheduling, execution, arithmetic-logic units (ALUs), and registers. Each of core clusters 402A-N also includes load/store unit (LSU) 406, level 1/level 2 (L1/L2) caches 408, and bus interface unit 410 (BIU). Processor 400 also includes caching and home agent (CHA) 414, which includes ingress 416, store data buffer SD 418, table of requests (TOR) 420, home agent (HA) 422, call pipe 424, and home agent (HA) pipe 426. Intra die interconnect (IDI) 412 couples core cluster 402 to CHA 414. Also shown are snoop filter (SF)/last level cache (LLC) 428, with which CHA 414 communicates in order to service the RAO instruction. CHA 414 is sometimes referred to herein as a cache control circuit.

Where RAO Operations are Executed

Embodiments of the remote atomic operations, as defined as instructions in various embodiments herein, may be performed in a variety of locations in the processor, such as: at one or more of the cores of a multi-core processor, at a private cache, at a shared cache or caching and home agent (CHA), at the memory controller, or at a remote socket in a multi-socket system. RAO instructions are for both single-socket and multi-socket systems.

Figure 5:
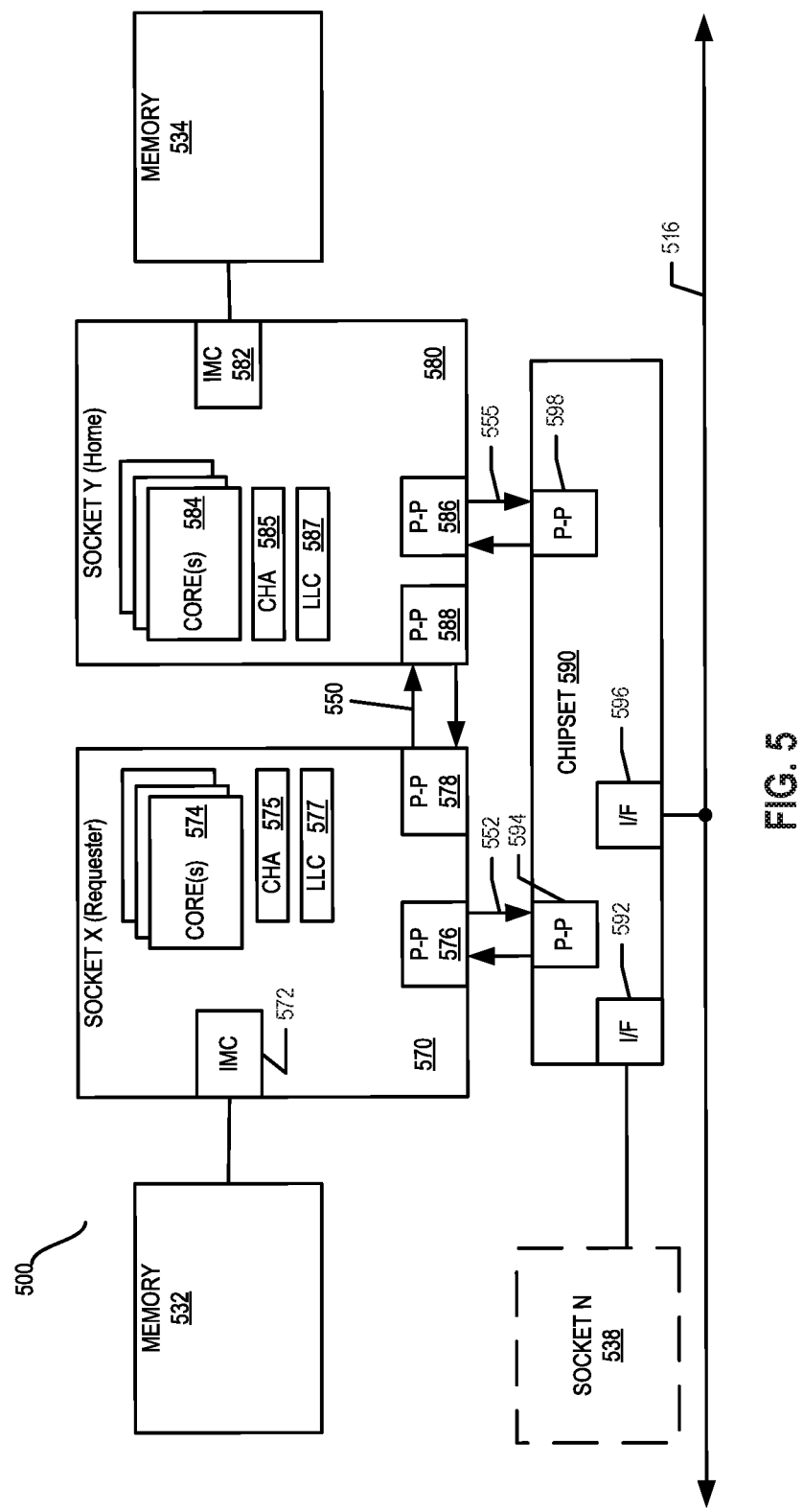
FIG. 5 illustrates portions of a multi-socket system for executing instructions for remote atomic operations, according to some embodiments.

FIG. 5 illustrates portions of a multi-socket system for executing instructions for remote atomic operations, according to some embodiments. As shown, system 500 includes Socket X (Requester) 570 and Socket Y (Home) 580, which in some embodiments are physical sockets on a printed circuit board, each socket housing a multi-core processor. Socket X (Requester) 570 and Socket Y (Home) 580 include integrated memory and I/O control logic ("IMC") 572 and 582, respectively. Socket X (Requester) 570 and Socket Y (Home) 580 each includes one or more cores 574 and 584, caching and home agent (CHA) 575 and 585, last level cache (LLC) 577 and 587, and point-to-point interfaces 576, 578, 588, and 586. System 500, further includes chipset 590, which includes point-to-point interfaces 594 and 598 and high-performance interfaces 592 and 596 to communicate with bus 516 and optional Socket N 538. System 500 includes additional components, for example as illustrated and discussed below with respect to FIG. 18 to FIG. 22, which, for clarity, are not shown in FIG. 5.

In some embodiments, the execution circuit selected to perform an RAO instruction reflects a static selection, for example as selected by a hardware designer designing system 500. Each of the multiple cores 574 and 584 can be associated with a caching and home agent (CHA), for example CHA 575 and CHA 585, which executes the remote atomic instruction.

In other words, in some embodiments, the location where the remote atomic operation is executed is chosen statically by the hardware designer, statically by software, or dynamically by the RAO instruction. In some embodiments, the location where the remote atomic operation is to be executed is chosen by each instruction including an immediate to indicate where to execute the instruction. In some embodiments, the processor includes a software programmable control register to be set by software to indicate where RAO instructions should be executed. In some embodiments, the processor includes separate software programmable control registers to be set by software for different instructions (e.g., ADD and CMPXCHG) or different groups of instructions) to indicate where the RAO instruction is to be executed. In some embodiments, the processor includes separate software programmable control registers for each different type of instruction or group of instructions, the control registers to be set by software to indicate where the RAO instruction is to be executed. In some embodiments, the processor has separate controls for different instructions or groups of instructions.

In some embodiments, the processor uses some information from hardware to predict the best location to execute an RAO instruction. In such embodiments, the processor uses both the information received from the hardware and the controls provided by software (e.g., as part of the instruction, as a control register, as part of a page table entry, or as part of a mapping of system sockets to logical memory ranges as illustrated and discussed with respect to FIGS. 6A and 6B) to determine where to execute the RAO instruction. In such embodiments, the controls provided by the software are more like a hint than they are a directive.

Figure 6A:
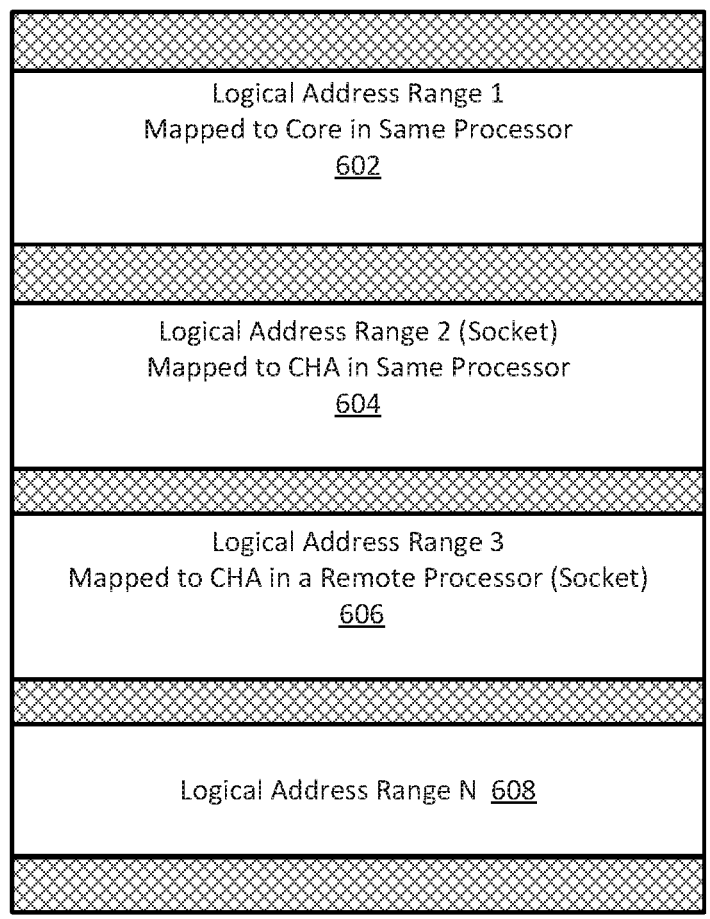
FIG. 6A illustrates a physical memory map having various memory regions being mapped to execute RAO instructions at various locations, according to some embodiments.
Figure 6B:
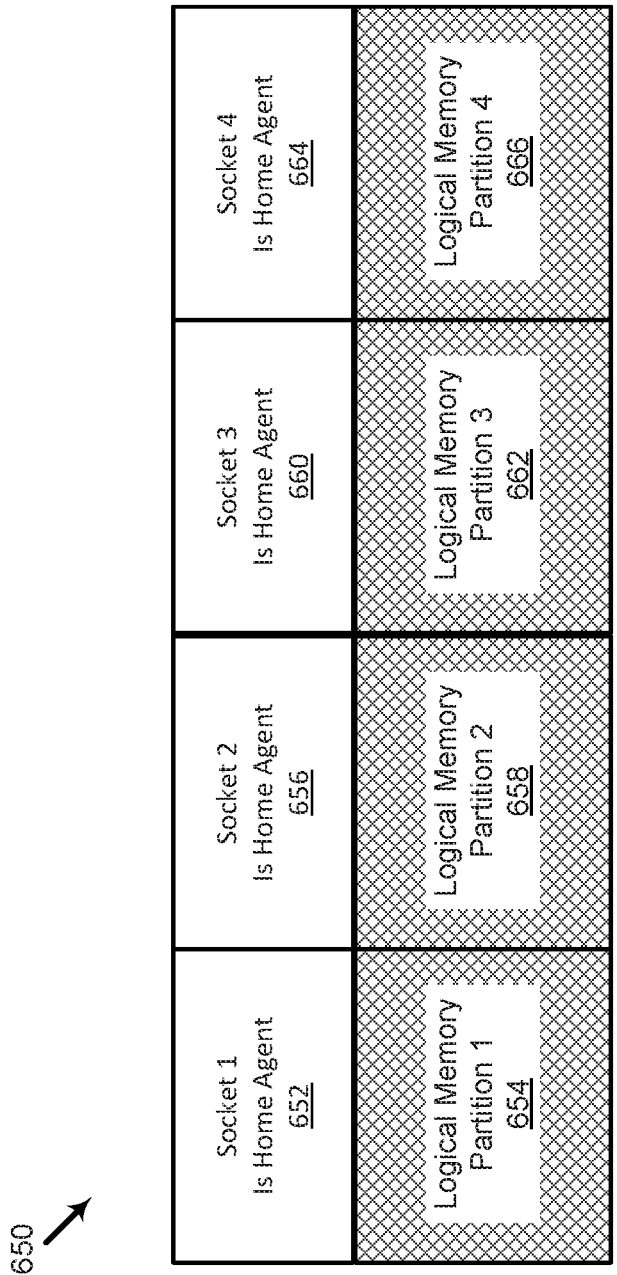
FIG. 6B illustrates a logical memory map identifying home agents or home sockets for each of multiple logical memory ranges, according to some embodiments.

In some embodiments, a property is added to addresses (e.g., in the page table entry) indicating where RAO instructions should be executed on those addresses. FIGS. 6A and 6B and their associated discussions illustrate a mapping of system sockets that serve as a home agent to various logical memory ranges.

FIG. 6A illustrates an RAO execution map to map RAO instructions to various memory ranges to various RAO execution circuits, according to some embodiments. As shown, RAO execution map 600 includes mappings for logical address range 1 602, logical address range 2 604, logical address range 3 606, and logical address range N 608.

As shown, RAO instructions having a destination identifier pointing to a logical address in the region of address range 1 602 are to use execution circuitry in a specified CPU core in the same processor as the core issuing the RAO instruction. For example, with reference to FIG. 4, one of the cores 402 issuing an RAO instruction to an address within address range 1 may be programmed to issue the RAO instruction for execution by another one of the cores 402.

As shown, RAO instructions having a destination identifier pointing to a logical address in the region of address range 2 604 are to use execution circuitry in a cache control circuit of the processor containing the core issuing the RAO instruction. For example, one of the cores 402 (FIG. 4) issuing an RAO instruction to an address within address range 2 may be programmed to issue the RAO instruction for execution by cache control circuit (CHA) 414 (FIG. 4).

As shown, RAO instructions having a destination identifier pointing to a logical address in the region of address range 3 604 are to use execution circuitry in a cache control circuit contained in a different socket. For example, one of the cores 402 (FIG. 4) issuing an RAO instruction to an address within address range 3 may be programmed to issue the RAO instruction for execution by cache control circuit (CHA) 414 (FIG. 4), which is in a different processor (socket).

In some embodiments, the mapping of each memory region to an execution circuit is implemented by adding a page table entry specifying where RAO instructions directed to that region are to be executed. In some embodiments, the mapping of each memory region to an execution circuit is implemented by storing a mapping of memory regions to execution circuits in memory. In some embodiments of a multi-processor (multi-socket) system, each processor maintains a copy of the RAO execution map 600 in its associated memory, for example, with reference to FIG. 5, Socket X (Requester) 570 maintains a copy of RAO execution map 600 in its associated memory 532, and Socket Y (Home) 580 maintains a copy of RAO execution map 600 in its associated memory 534.

FIG. 6B illustrates a logical memory map identifying, for each of multiple logical memory ranges, a corresponding home agent (e.g., a caching agent and a memory agent in a home socket) mapped to the logical address range, according to some embodiments. As shown, home agent map 650 identifies socket 1 652 as the home agent (e.g., in a home socket) for logical address range 1 654, socket 2 656 as the home agent (e.g., in a home socket) for logical address range 2 658, socket 3 660 as the home agent (e.g., in a home socket) for logical address range 3 662, and socket 4 664 as the home agent (e.g., in a home socket) for logical address range 4 666. In some embodiments, home agent map 650 is stored in a predetermined memory location to be accessed by a CPU core when issuing an RAO instruction or by a cache control circuit when processing the RAO instruction. In some embodiments, multiple copies of home agent map 650 are stored in multiple memories associated with each of multiple sockets, respectively. In some embodiments of a multi-socket (multi-processor) system, each socket maintains a copy of the mapping in its associated memory, for example, with reference to FIG. 5, Socket X (Requester) 570 maintains a copy of home agent map 650 in its associated memory 532, and Socket Y (Home) 580 maintains a copy of home agent map 650 in its associated memory 534.

The operation flow, when an RAO instruction is executed at the requesting socket is now illustrated. In operation, a CPU core, when issuing an RAO instruction to a given logical address, or a requester cache control circuit, when processing the RAO instruction, accesses home agent map 650 to determine a home agent (e.g., in a home socket), for example at block 804 (FIG. 8) or block 1004 (FIG. 10), to which to provide the RAO instruction.

Figure 7:
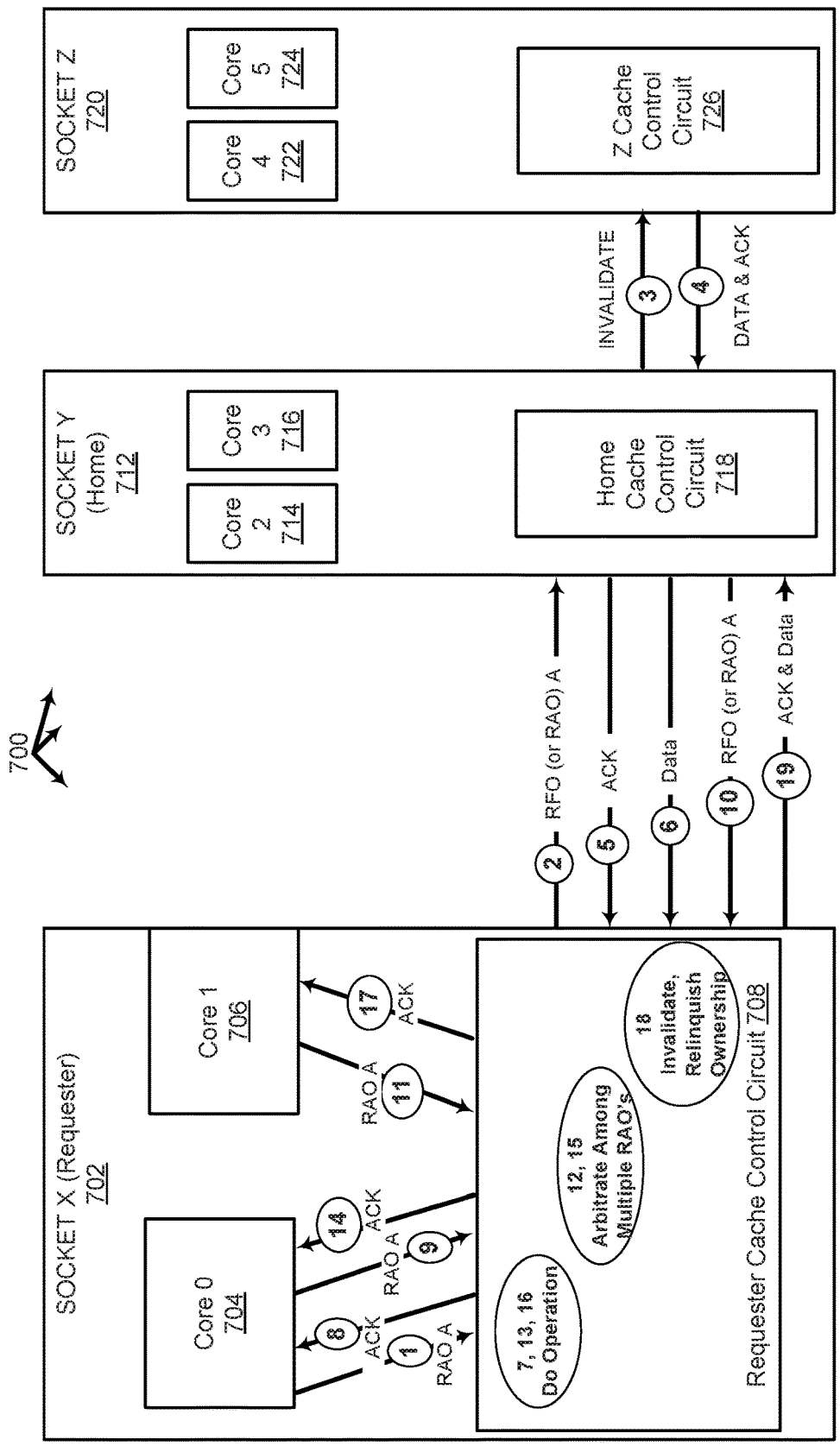
FIG. 7 is a block flow diagram illustrating execution of instructions for remote atomic operations by a multi-socket system, according to some embodiments.

FIG. 7 is a block flow diagram illustrating execution of instructions for remote atomic operations by a multi-socket system, according to some embodiments. As shown, system 700 includes Socket X (Requester) 702, which includes core 0 704, core 1 706, and requester cache control circuit 708. System 700 further includes Socket Y (Home) 712, which includes core 2 714, core 3 716, and home cache control circuit 718. System 700 further includes Socket Z 720, which includes core 4 722, core 5 724, and Z cache control circuit 726. FIG. 7 includes numbered arrows, each signifying an action taken as part of executing a remote atomic operation.

Starting with the arrow labeled as '1,' core 0 704 generates and provides an RAO instruction to address A to requester cache control circuit 708. Address A addresses a cache line in memory. Requester cache control circuit 708 determines that Socket Y (Home) 712 is the home socket for the memory location for address A, and, at arrow 2, generates and provides a request for ownership (RFO) to home cache control circuit 718 of Socket Y (Home) 712. In response, at arrow 3, home cache control circuit 718, after determining that socket Z 720 has a modified copy of the addressed cache line, instructs socket Z 720 to invalidate the addressed cache line. After invalidating the cache line, socket Z 720 at arrow 4 causes the modified cache line data to be returned to home cache control circuit 718, which at arrows 5 and 6 returns an acknowledgement and the modified data, respectively, to the requester cache control circuit 708 of Socket X (Requester) 702. At this point, the modified data represents the latest version of the addressed cache line, system-wide. In some embodiments, when socket Z 720 has a shared copy of the addressed cache line, and has not modified it, it would provide an acknowledgement at arrow 4, without any modified data. In some embodiments, socket Z 720 returns the addressed cache line to socket Y (Home) 712, whether modified or not. At block 7, execution circuitry performs the specified operation of the RAO instruction on the data, and at arrow 8 returns an acknowledgment to core 0 704.

With Socket X (Requester) 702 having established ownership of the cache line addressed by A, further multiple local RAO instructions to address A can now be executed at Socket X (Requester) 702, independently of the home socket. At arrows 9 and 11, multiple local RAO instructions to address A are received by requester cache control circuit 708 from core 0 704 and core 1 706, respectively. While the multiple local received RAO instructions are pending, at arrow 10, a request for ownership (RFO) is received by requester cache control circuit 708 from home cache control circuit 718 of Socket Y (Home) 712.

At block 12, requester cache control circuit 708 arbitrates among the three pending RAO instructions. In some embodiments, as here, requester cache control circuit 708 favors the multiple, local, pending RAO instructions over incoming RFO requests from remote sockets. As described further below, requester cache control circuit 708 does attempt to avoid starving the remote socket by altogether disregarding its pending RAO instruction to address A (as described in the section entitled "Preventing Starvation of Requests from Remote Sockets"). Accordingly, at block 13 and arrow 14, requester cache control circuit 708 performs the operation requested by the first pending RAO instruction atomically and returns an acknowledgement to core 0 704.

At block 15, requester cache control circuit 708 arbitrates among the two RAO instructions still pending from core 1 706 and home cache control circuit 718. Again, in some embodiments, as here, requester cache control circuit 708 favors local, pending RAO instructions over incoming RFO requests from remote sockets, while attempting to avoid starving the remote socket by altogether disregarding its pending RAO instruction to address A (as described in the section entitled "Preventing Starvation of Requests from Remote Sockets"). Accordingly, at block 16 and arrow 17, requester cache control circuit 708 performs the operation requested by the pending RAO instruction from core 1 706 atomically and returns an acknowledgement to core 1706.

At block 18, with only the RAO instruction from home cache control circuit 718 pending, requester cache control circuit 708 invalidates the cache line addressed by A in caches within Socket X (Requester) 702, and relinquishes ownership to Socket Y (Home) 712. Finally, at arrow 19, requester cache control circuit 708 provides an acknowledgement and the cache line data to home cache control circuit 718 of Socket Y (Home) 712.

It should be understood that in between the occurrences of events identified by arrows/blocks 1-19, normal, non-RAO instructions can be generated by cores 0-5 704, 706, 714, 716, 722, and 724. Those non-RAO instructions are serviced according to the socket's normal cache coherency protocol. For sake of simplicity, however, FIG. 7 focuses on, and only illustrates RAO instructions to the cache line addressed by address A.

Figure 8:
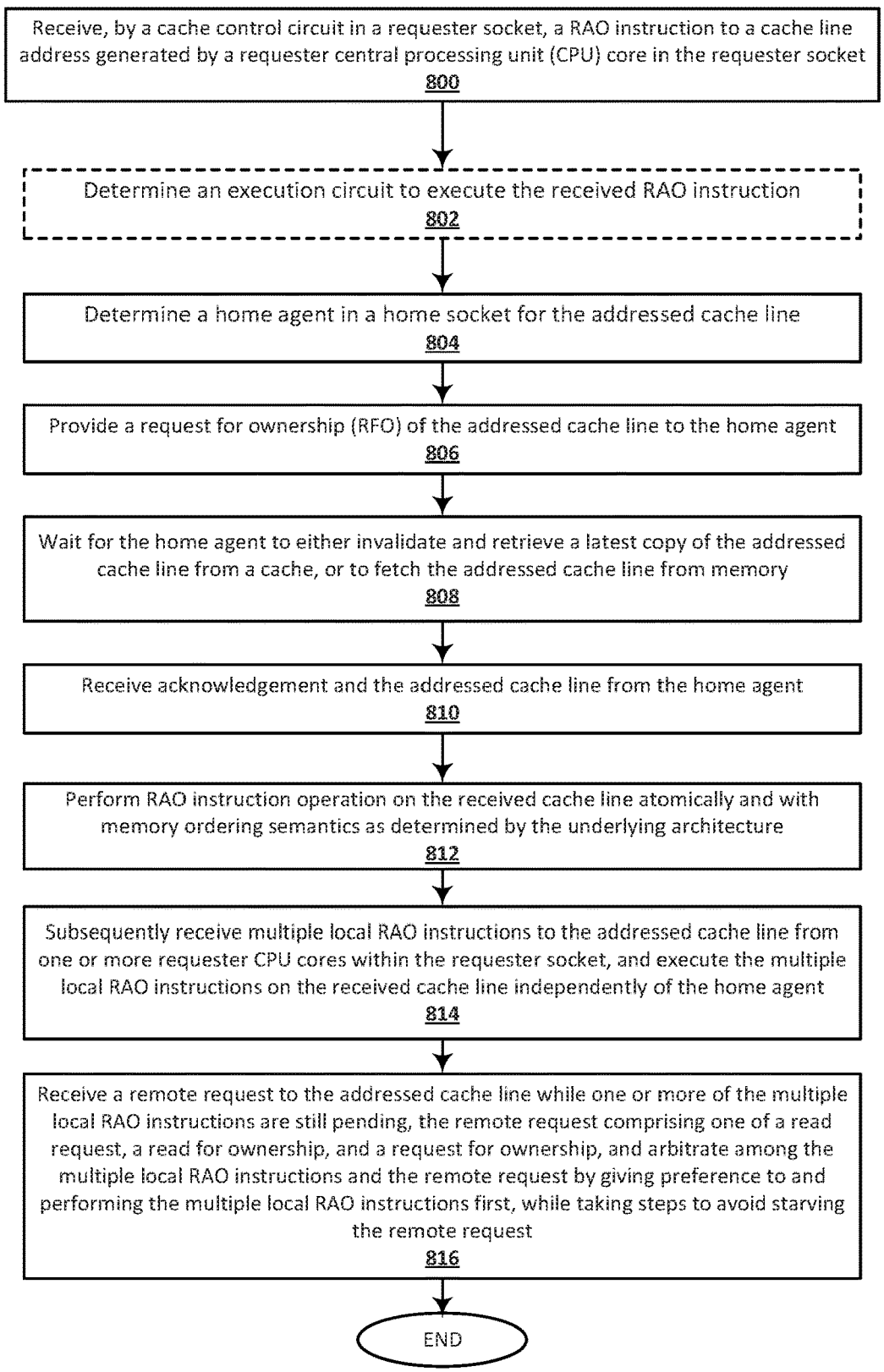
FIG. 8 is a flow diagram illustrating execution of instructions for remote atomic operations by a cache control circuit in a multi-socket system, according to an embodiment.

FIG. 8 is a flow diagram illustrating execution of instructions for remote atomic operations by a cache control circuit in a multi-socket system, according to an embodiment.

At 800, the cache control circuit in a requester socket receives an RAO instruction to a cache line address generated by a requester central processing unit (CPU) core in the requester socket.

At 802, the cache control circuit in the requester socket determines an execution circuit to execute the RAO instruction. As illustrated and described with respect to FIG. 4, RAO instructions, in accordance with various embodiments herein, may be performed in a variety of locations in a socket, such as: at one or more of the cores, at a private cache, at a shared cache or caching and home agent (CHA), at the memory controller, or at a remote socket in a multi-socket system. For purposes of the process illustrated in FIG. 8, the RAO instruction is to be executed by the cache control circuit of the requester socket. An embodiment of determining where to execute the RAO instruction is illustrated and discussed with respect to FIG. 6A.

802 is optional, as indicted by its dashed border, insofar as it may be combined with the determination made at 804, or it may be implied by the RAO opcode (e.g., RAOHO-MECHA).

At 804, the requester cache control circuit determines a home agent in a home socket for the cache line addressed by the RAO destination. In some embodiments, a mapping is stored in memory and is accessed to map the cache line address to a particular "home socket." An embodiment of determining the home agent (home socket) for an addressed cache line is illustrated and discussed with respect to FIG. 6B.

At 806, the requester cache control circuit provides a request for ownership (RFO) of the addressed cache line to the home agent (home socket), the RFO complying with a cache coherency protocol. At 808, the requester cache control circuit waits for the home agent to either invalidate and retrieve a latest copy of the addressed cache line from a cache, or to fetch the addressed cache line from memory. At 810, the requester cache control circuit receives acknowledgement and the addressed cache line from the home agent. At 812, the requester cache control circuit performs the RAO instruction operation on the received cache line atomically and with memory ordering semantics as determined by the underlying architecture.

In some embodiments, the requester cache control circuit causes the received cache line to be stored in a cache hierarchy of the requester socket, so as to service, without involving the home agent, subsequent RAO instructions from one or more requester CPU cores within the requester socket.

At 814, the requester cache control circuit subsequently receives multiple local RAO instructions to the addressed cache line from one or more requester CPU cores within the requester socket, and executes the multiple local RAO instructions on the received cache line independently of the home agent. In so doing, the requester socket is able to perform multiple RAO instructions on an addressed cache line without having to incur the latency of involving the home agent.

At 816, the requester cache control circuit receives a remote request to the addressed cache line while one or more of the multiple local RAO instructions are still pending, the remote request comprising one of a read request, a read for ownership, and a request for ownership, and arbitrates among the multiple local RAO instructions and the remote request by giving preference to and performing the multiple local RAO instructions first, while taking steps to avoid starving the remote request. Some exemplary approaches to taking steps to avoid starving the remote request are described below.

Preventing Starvation of Requests from Remote Sockets

In some situations, a cache control circuit that has received multiple RAO instructions must arbitrate among them to determine which to execute. Exemplary embodiments of a cache control circuit arbitrating among multiple received local and remote RAO instructions are illustrated and discussed with respect to block 814 of FIG. 8 and block 1022 of FIG. 10, where preference is given to the local RAO instructions while avoiding starvation of the remote request.

In some embodiments, one way to avoid starving the remote request is to take advantage of an existing starvation avoidance mechanism of the cache coherency protocol of the multi-socket system.

In some embodiments, another way to avoid starving the remote request in a multi-socket system is to set a priority level in the remote RAO instruction, giving higher priority, for example, to a remote RAO instruction that has been identified as high-priority (for example, an RAO instruction associated with a mission-critical or time-sensitive real-time application), and giving lower priority to a remote RAO instruction that has been identified as low priority (for example, updating a database entry that can wait).

Figure 9:
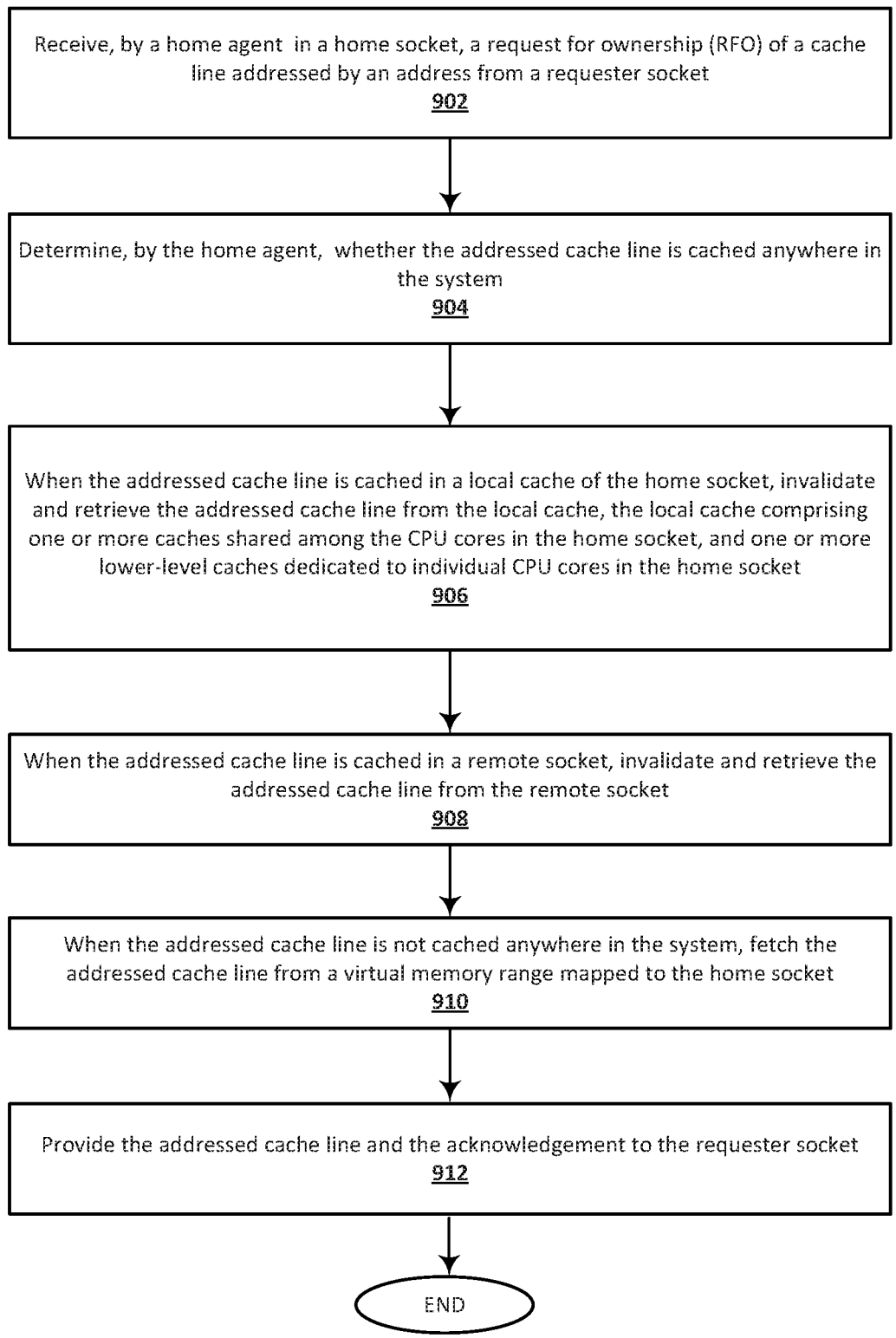
FIG. 9 is a flow diagram illustrating execution of instructions for remote atomic operations by a home socket in a multi-socket system, according to an embodiment.

FIG. 9 is a flow diagram illustrating execution of instructions for remote atomic operations by a home agent (home socket) in a multi-socket system, according to an embodiment. At 902, a home agent of the home socket receives a request for ownership (RFO) of a cache line addressed by an address from a requester socket. At 904, the home agent determines whether the addressed cache line is cached anywhere in the system. In some embodiments, the determination is made using a directory-based mechanism. In some embodiments, the determination is made using a snoop broadcast based mechanism. The location could be in any of a) in the home agent cache, b) elsewhere in the cache hierarchy of the home socket or another socket, or c) the memory.

In some embodiments, the home agent includes a caching agent to keep track of a system-wide cache state of a cache line having an address within a virtual address range mapped to the home agent, the system-wide cache state complying with a cache coherency protocol of the multi-socket system. In some embodiments, the system-wide cache state of a cache line includes one or more of Modified (M), Shared (S), Invalid (I), Owned (O), and Exclusive (E).

At 906, when the addressed cache line is cached in a local cache of the home socket, the home agent invalidates and retrieves the addressed cache line from the local cache, the local cache comprising one or more of caches shared among the CPU cores in the home socket, and one or more lower-level caches dedicated to individual CPU cores in the home socket. At 908, when the addressed cache line is cached in a remote socket, the home agent invalidates and retrieves the addressed cache line from the remote socket.

At 910, when the addressed cache line is not cached anywhere in the system, the home agent fetches the addressed cache line from a virtual memory range mapped to the home socket. In some embodiments, the home agent includes a memory agent to interface with and service requests to the memory.

At 912, the home agent provides the addressed cache line and the acknowledgement to the requester socket. The process then ends.

Figure 10:
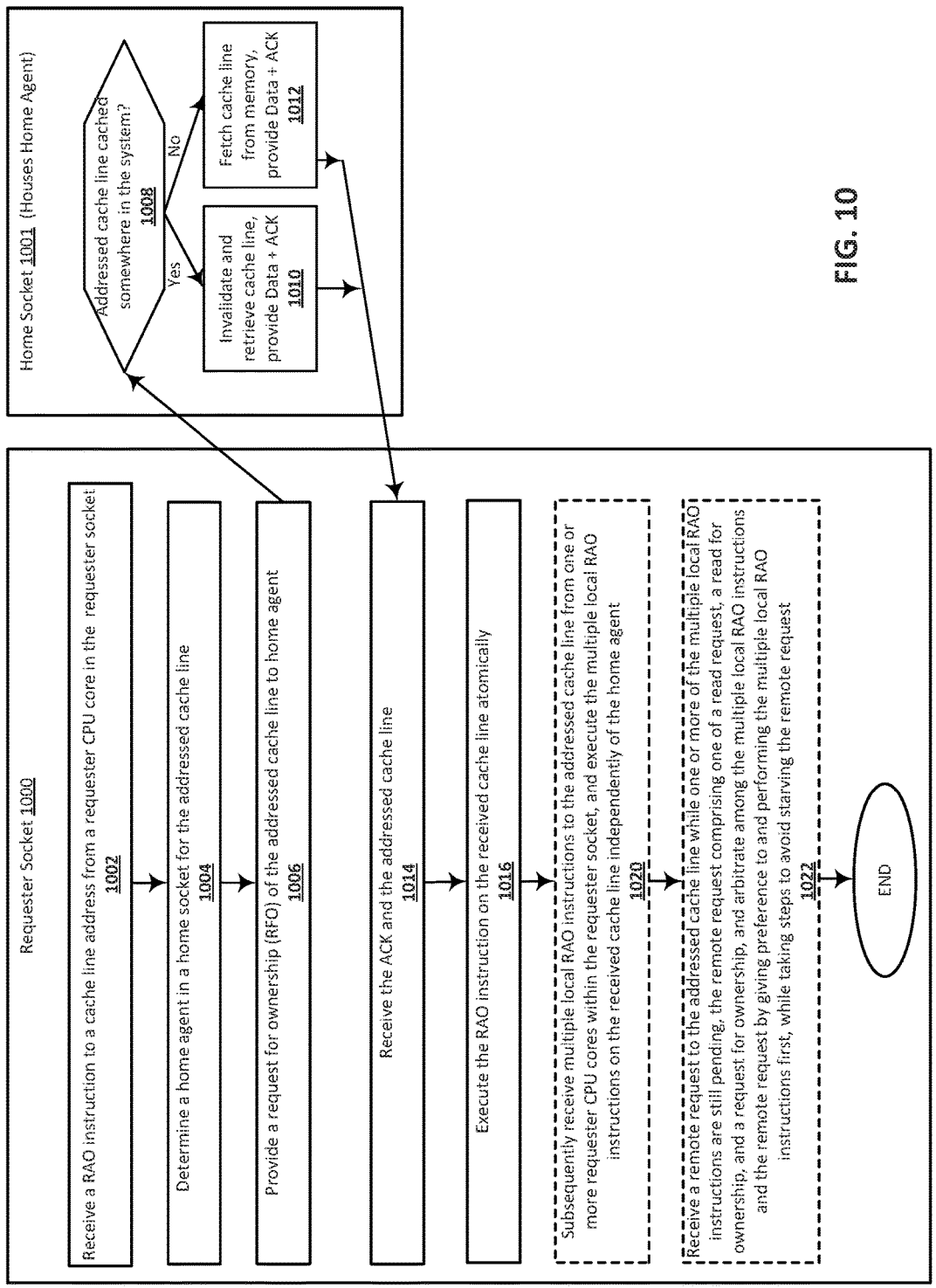
FIG. 10 is a flow diagram illustrating execution of instructions for remote atomic operations in a multi-socket system, according to some embodiments.

FIG. 10 is a flow diagram illustrating execution of instructions for remote atomic operations in a multi-socket system, according to some embodiments. As shown, requester socket 1000 and home socket 1001 participate in the execution of the RAO instruction. At 1002, a requester cache control circuit within requester socket 1000 receives an RAO instruction to a cache line address from a requester CPU core within the requester socket. At 1004, the requester cache control circuit determines a home agent in a home socket for the addressed cache line. In some embodiments, the cache control circuit determines the home agent based on the cache line address by accessing a mapping of home agents to address ranges, as described and illustrated with respect to FIG. 6B.

At 1006, the requester cache control circuit provides a request for ownership (RFO) of the addressed cache line to home agent 1001. At 1008, a home agent within home socket 1001 determines whether the addressed cache line is cached somewhere in the system. For example, the addressed cache line could be cached in a shared, level-three cache of the home socket 1001. For example, the addressed cache line could be cached in a level-one cache dedicated to a CPU core within the home socket 1001. Or, the addressed cache line could be cached in a cache hierarchy of a remote socket. When the home agent determines that the addressed cache line is cached somewhere in the system, at 1010, the home agent invalidates and retrieves cache line according to a cache coherency protocol of the multi-socket system, and provides the cache line data and an acknowledgement to the requester socket 1000.

At 1012, when it is determined that the addressed cache line is not cached anywhere in the system, the home agent fetches the addressed cache line from memory, and provides the cache line data and an acknowledgement to the requester socket 1000.

At 1014, the requester cache control circuit receives the acknowledgement (ACK) and the addressed cache line. At 1016, the requester cache control circuit executes the RAO instruction on the received cache line atomically. At this point, the RAO instruction received from the requester CPU core has been executed.

As shown, at 1020, the requester cache control circuit subsequently receives multiple local RAO instructions to the addressed cache line from one or more requester CPU cores within the requester socket, and executes the multiple local RAO instructions on the received cache line independently of the home agent. In so doing, the requester cache control circuit benefits from avoiding the latency and overhead that would be required to involve the home agent on every RAO instruction.

Subsequently, at 1020 the requester cache control circuit receives multiple additional RAO instructions to the address from one or more requester CPU cores, and also receives a remote request comprising one of a read, a read for ownership, and an RFO of the address from the home agent (home socket). Operation 1020 is conditional, as illustrated by its dashed border, insofar as there could be no further accesses from any requester CPU cores.

As shown, at 1022, the requester cache control circuit receive a remote request to the addressed cache line while one or more of the multiple local RAO instructions are still pending, the remote request being one of a read request, a read for ownership, and a request for ownership. In some embodiments, the requester cache control circuit then arbitrates among the multiple local RAO instructions and the remote request by giving preference to and performing the multiple local RAO instructions first, while taking steps to avoid starving the remote request (as described in the section entitled "Preventing Starvation of Requests from Remote Sockets"). Operation 1022 is conditional, as illustrated by its dashed border, insofar as there could be no further accesses pending from any requester CPU cores, in which case, when a remote request is received, it is granted. In that case, the addressed cache line transitions to that socket, in the same manner as the line transitioned to the requester socket, and subsequent RAO instructions received from requester CPU cores in the requester socket start the process again at operation 1002.

RAO Instruction Types

In some embodiments, executing the RAO instruction involves a read-modify-write, whereby an execution circuit reads the contents of a memory location, modifies the data that was read, and writes the result back to the memory location. Optional parameters can serve to modify the operation that is performed during the modify stage.

There are two different classes of RAO instructions: those whose only output is the memory location that is atomically updated, and those that also have a destination register. There are microarchitectural implications of this difference.

RAO instructions whose only output is the memory location that is atomically updated can be weakly ordered—due to the weak ordering, such an RAO instruction is retired as soon as the operation is ordered or globally observable at the home caching or memory agent, without waiting for the operation to complete. Instructions with a CPU register destination, on the other hand, can similarly retire as soon as the operation is ordered or globally observable at the home caching or memory agent, but the core must still track that the instruction will be producing a value for its destination register, to enforce data dependences on any consumers. For this reason, in some embodiments, instructions with a register destination are treated as more strongly ordered than the RAO instructions without a CPU register destination. In other embodiments, RAO instructions may follow the memory ordering model of the instructions in the underlying architecture.

All RAO instructions specify a memory destination to be updated, and an opcode to specify the operation. Embodiments disclosed herein cover the following specific operations, and are extensible to others.

Figure 11:
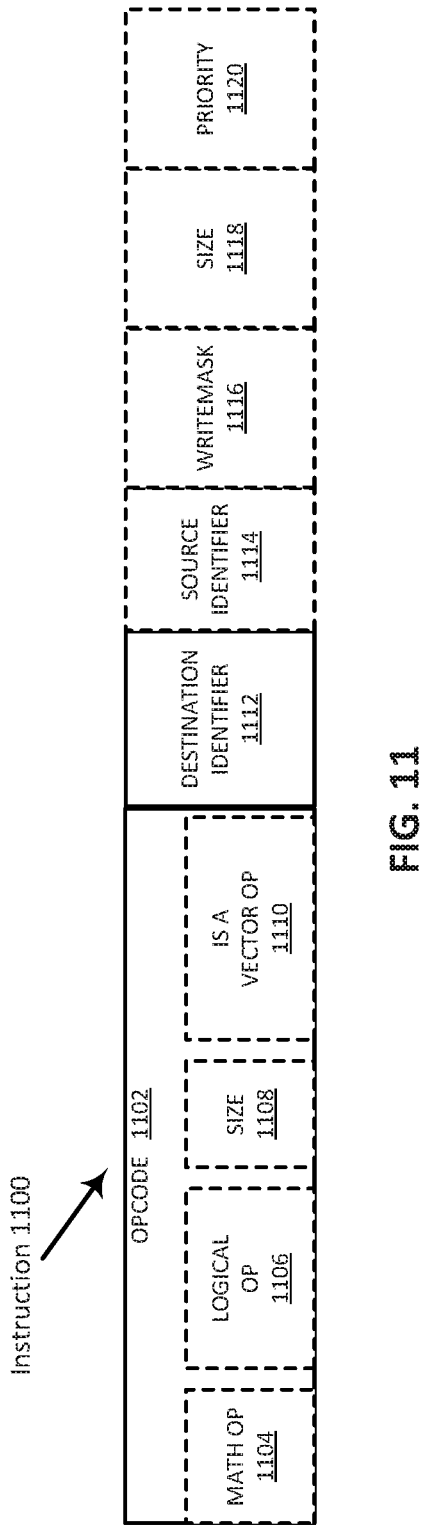
FIG. 11 is a block diagram illustrating a format and optional parameters for instructions for remote atomic operations, according to some embodiments.

No Register Destination (i.e., OP Memdest, Reg)
 RAO_ADD—integer addition
 RAO_SUB—integer subtraction
 RAO_ADD_SAT—integer saturating addition
 (Page 13, top) RAO_SUB_FLR—integer subtract w/ floor
 RAO_AND—logical AND
 RAO_OR—logical OR
 RAO_XOR—logical XOR
RAO Instructions with Register Destination (i.e., OP Memdest, Regdest, Reg)
 RAO_ADD_THR—integer addition with threshold (reg destination is a single bit flag)
 RAO_SUB_THR—integer subtraction with threshold (reg destination is a single bit flag)
 RAO_XADD—integer exchange and add
 RAO_XCHG—exchange
 RAO_CMPXCHG—compare and exchange
RAO Instruction Formats FIG. 11 is a block diagram illustrating a format and optional parameters for instructions for remote atomic operations, according to some embodiments. As shown, instruction 1100 includes opcode 1102 and destination identifier 1112, as well as several optional fields, each shown with a dashed border.

Opcode 1102 can include optional prefixes or suffixes, including optional math operation (MATH OP) 1104 (e.g., Add, Subtract, Divide, Multiply, Modulus, etc.), logical operation LOGICAL OP 1106 (e.g., AND, OR, NAND, NOR, XOR, XNOR, CMP, etc.), optional size identifier 1108, and vector operation designation (IS A VECTOR OP) 1110. In some embodiments, these optional parameters are included as part of the opcode, separated perhaps by underscores. In other embodiments, these parameters are separate operands or instruction fields.

For example, MATH OP 1104 can be _ADD_, in which case the RAO instruction calls for reading the location identified by destination identifier 1112, adding the data identified by an immediate or by the contents of the identified source, and write the result back to the location identified by the destination identifier 1112.

Optional size identifier 1108, in some embodiments, is included in the opcode, for example, as a prefix or suffix, "B," "W," "D," and "Q," corresponding to a size—1 byte, 2 bytes, 4 bytes, or 8 bytes, respectively—of each vector element of an identified source or destination.

In some embodiments, optional size identifier 1108 is included as an opcode prefix or suffix, "H," "S," "D," "Q," and "E," corresponding to precision levels-Half precision (2 bytes), Single precision (4 bytes), Double precision (8 bytes), and Quadruple precision (16 bytes), respectively—of each vector element of the identified source or destination. In other embodiments, optional size identifier 1108 is an instruction parameter or operand, shown as size 1118, specifying the source or destination vector element's size and/or precision level.

Optional priority 1120 can be set to a scalar value, for example between 0 and 5, to specify the priority of the RAO instruction. As discussed in the section entitled "Preventing Starvation of Requests from Remote Sockets," optional priority 1120 can be set to a high number to indicate that RAO instruction sent to a different socket should not be starved. Optional priority 1120 can be set to a low value if it is of relatively low priority and can wait.

Optional source identifier 1114 identifies a source operand to be used in performing the operation specified by an RAO instruction. In some embodiments, optional source identifier 1114 specifies a source register, such as a register included in a processor's register file, as illustrated and described with respect to FIG. 14. In some embodiments, optional source identifier 1114 identifies a memory location. In some embodiments, optional source identifier 1114 specifies an immediate. Optional source identifier 1114 is optional insofar as an RAO instruction may specify an immediate operand (e.g., RAOADD memaddr 55) or not specify an operand at all (e.g., RAOINC memaddr).

Exemplary execution of RAO instructions, according to some embodiments, are illustrated and discussed with respect to FIG. 7 to FIG. 11. Exemplary instruction formats for remote atomic operation instructions are further discussed and illustrated with respect to FIG. 12 to FIG. 14, below.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Further Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
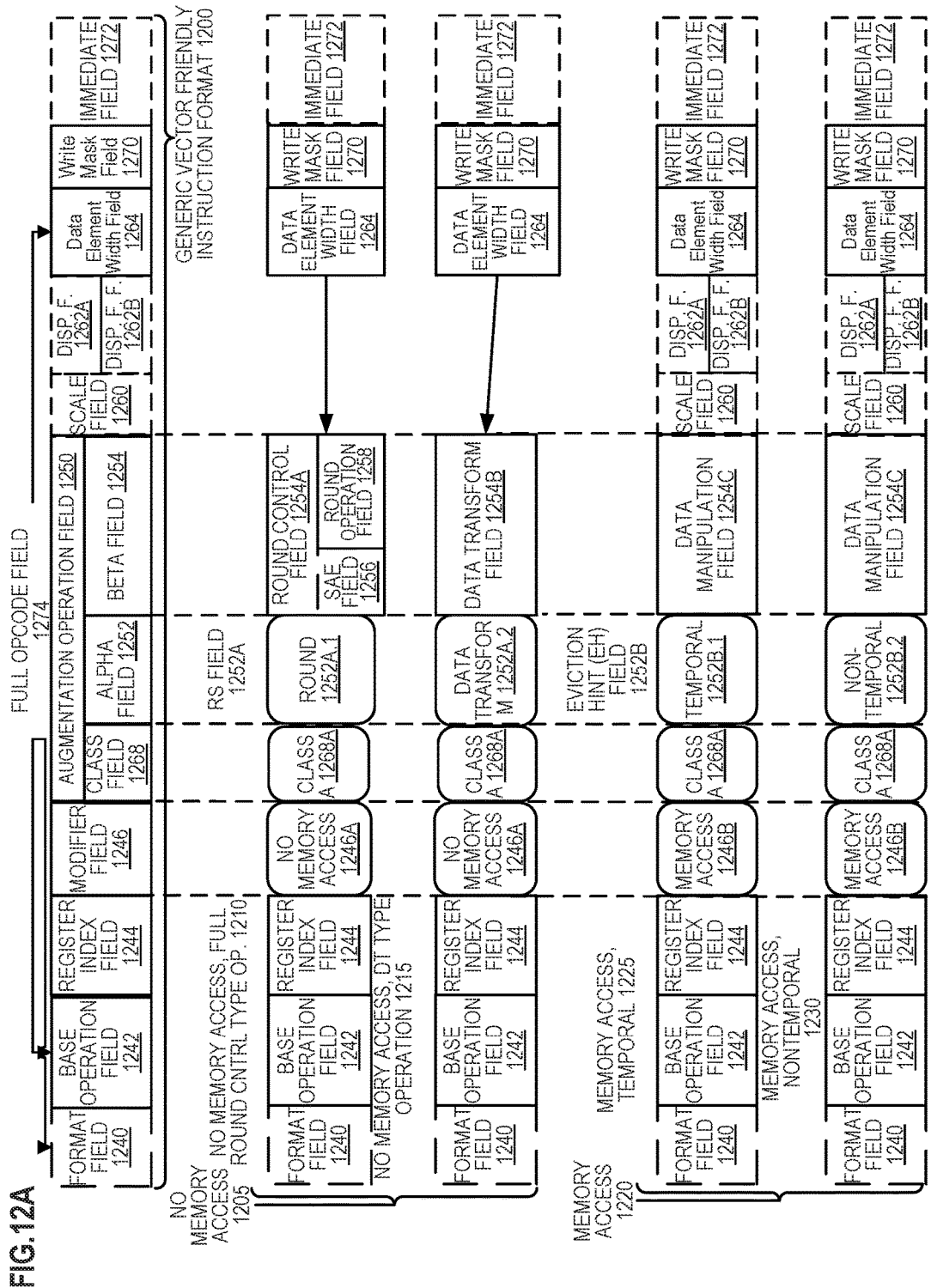
FIGS. 12A-12B are block diagrams illustrating a generic vector friendly instruction format and instruction templates thereof according to embodiments of the invention.
Figure 12B:
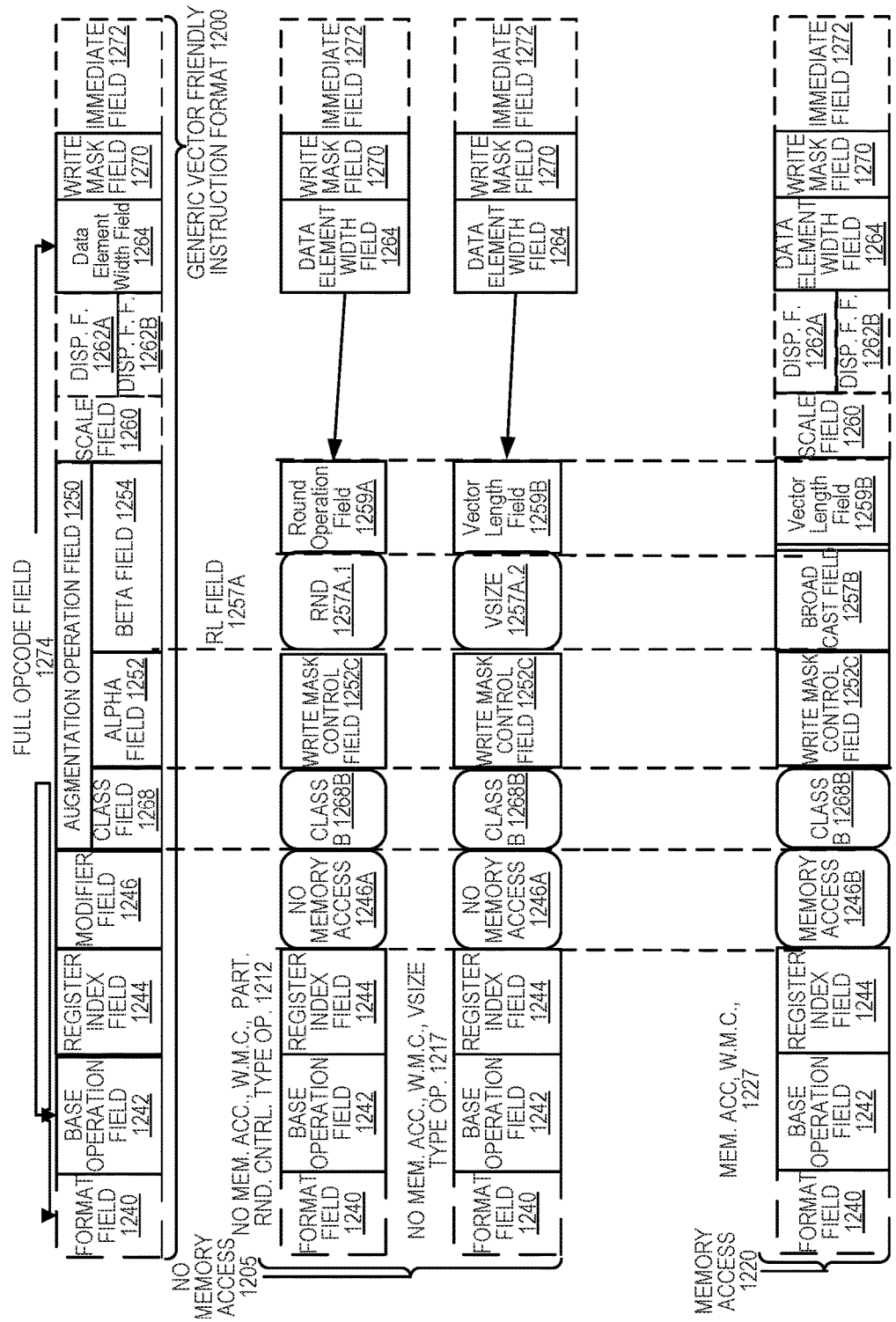

FIGS. 12A-12B are block diagrams illustrating a generic vector friendly instruction format and instruction templates thereof according to embodiments of the invention. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}$*index+base).

Displacement Field 1262A—its content is used as part of memory address generation (e.g., for address generation that uses $2^{scale}$*index+base+displacement).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access, full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates, suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A-just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13A is a block diagram illustrating an exemplary specific vector friendly instruction format according to embodiments of the invention. FIG. 13A shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13A map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]—R), EVEX.X bit field (EVEX byte 1, bit [6]—X), and 1257BEX byte 1, bit [5]—B). The EVEX.R, EVEX.X, and EVEX.B bit fields provide the same functionality as the corresponding VEX bit fields, and are encoded using 1 s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1264 (EVEX byte 2, bit [7]—W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (is complement) form. Depending on the instruction, an extra different EVEX bit field is used to extend the specifier size to 32 registers.

EVEX.U 1268 Class field (EVEX byte 2, bit [2]—U)—If EVEX.U=0, it indicates class A or EVEX.U0; if EVEX.U=1, it indicates class B or EVEX.U1.

Prefix encoding field 1325 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]—EH; also, known as EVEX.EH, EVEX.rs, EVEX.RL, EVEX.write mask control, and EVEX.N; also, illustrated with α)—as previously described, this field is context specific.

Beta field 1254 (EVEX byte 3, bits [6:4]—SSS, also known as $EVEX.s_{2-0}$, $EVEX.r_{2-0}$, EVEX.rr1, EVEX.LL0, EVEX.LLB; also, illustrated with βββ)—as previously described, this field is context specific.

REX' field 1210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes' offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement assumes that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.

Full Opcode Field

FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
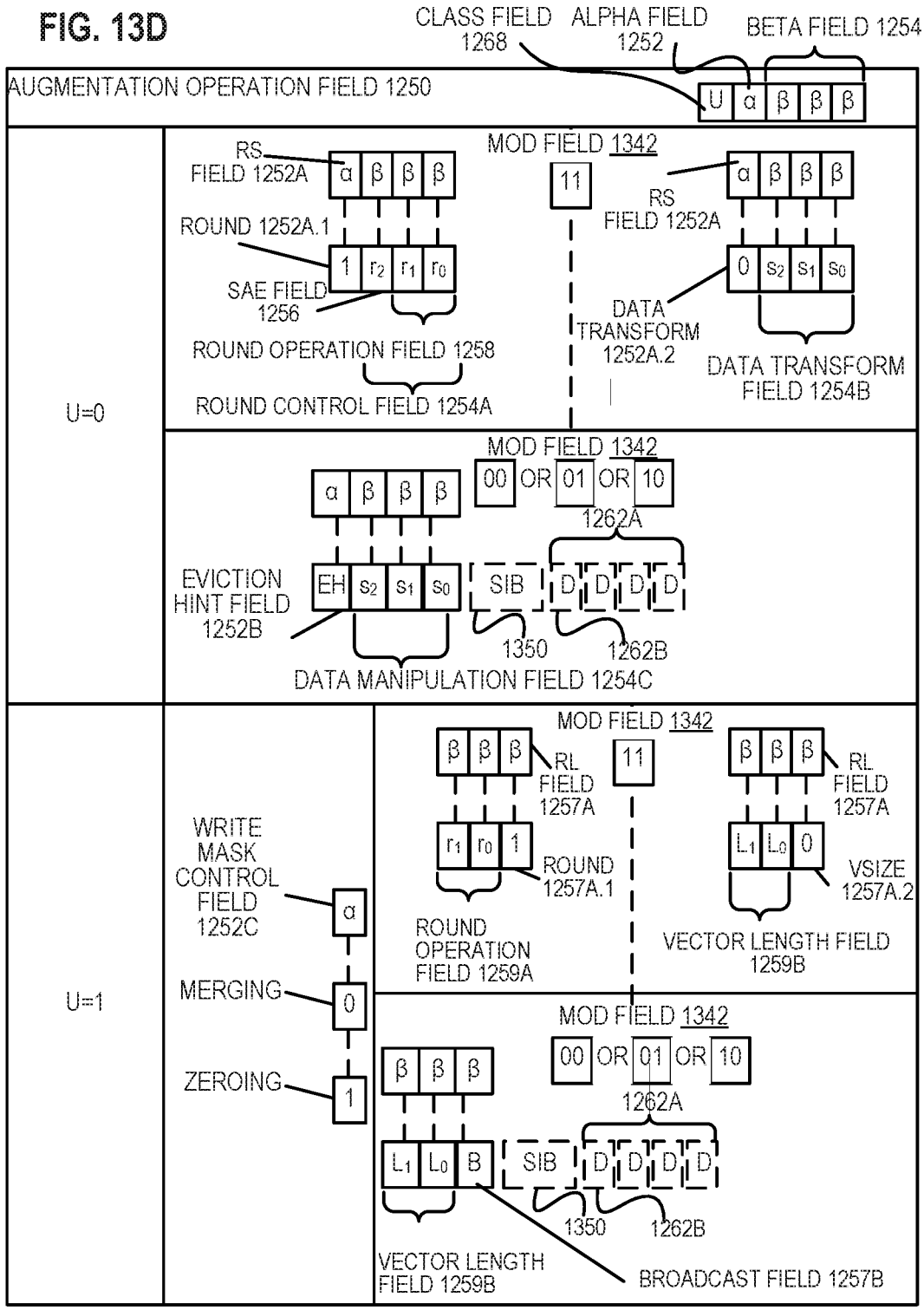
FIG. 13D is a block diagram illustrating the fields of the specific vector friendly instruction format that make up the augmentation operation field according to one embodiment of the invention.

FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]—EH) is interpreted as the rs field 1252A. When the rs field 1252A contains a 1 (round 1252A.1), the beta field 1254 (EVEX byte 3, bits [6:4]—SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]—SSS) is interpreted as a three bit data transform field 1254B. When U=0 and the MOD field 1342 contains 00, 01, or 10 (signifying a memory access operation), the alpha field 1252 (EVEX byte 3, bit [7]—EH) is interpreted as the eviction hint (EH) field 1252B and the beta field 1254 (EVEX byte 3, bits [6:4]—SSS) is interpreted as a three bit data manipulation field 1254C.

When U=1, the alpha field 1252 (EVEX byte 3, bit [7]—EH) is interpreted as the write mask control (Z) field 1252C. When U=1 and the MOD field 1342 contains 11 (signifying a no memory access operation), part of the beta field 1254 (EVEX byte 3, bit [4]—$S_0$) is interpreted as the RL field 1257A; when it contains a 1 (round 1257A.1) the rest of the beta field 1254 (EVEX byte 3, bit [6-5]—$S_{2-1}$) is interpreted as the round operation field 1259A, while when the RL field 1257A contains a 0 (VSIZE 1257.A2) the rest of the beta field 1254 (EVEX byte 3, bit [6-5]—$S_{2-1}$) is interpreted as the vector length field 1259B (EVEX byte 3, bit [6-5]—$L_{1-0}$). When U=1 and the MOD field 1342 contains 00, 01, or 10 (signifying a memory access operation), the beta field 1254 (EVEX byte 3, bits [6:4]—SSS) is interpreted as the vector length field 1259B (EVEX byte 3, bit [6-5]—$L_{1-0}$) and the broadcast field 1257B (EVEX byte 3, bit [4]—B).

Exemplary Register Architecture

FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1259B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 bytes, 32 bytes, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores (CPU cores) may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length-decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register-renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 16B:
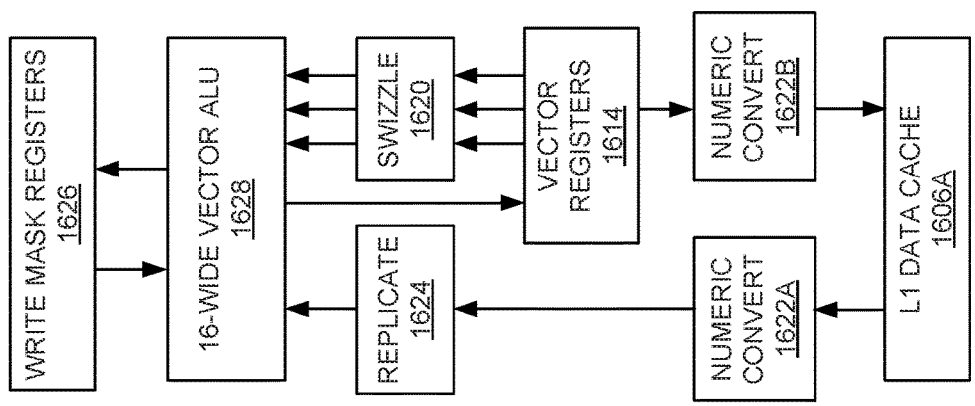
FIGS. 16A-B illustrate a block diagram of a more specific exemplary in-order core architecture, which core would be one of several logic blocks (including other cores of the same type and/or different types) in a chip.
Figure 16A:
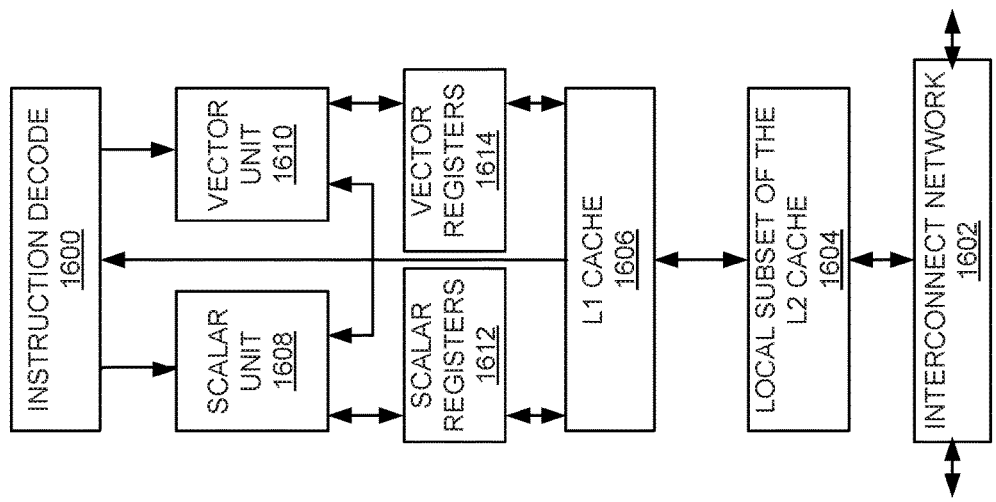

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
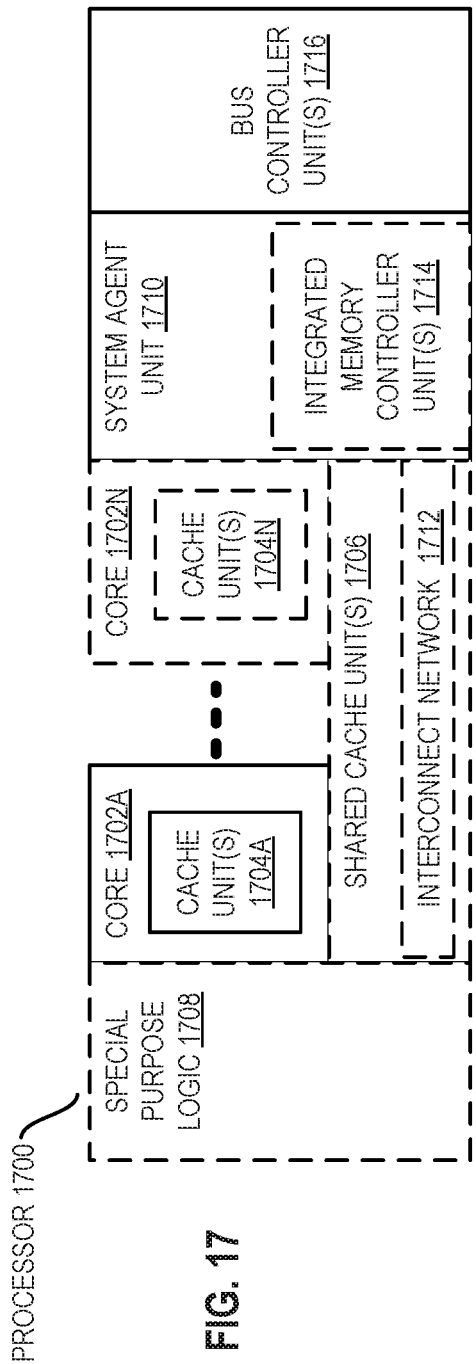
FIG. 17 is a block diagram of a processor that may have more than one core, may have an integrated memory con

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708 (integrated graphics logic 1708 is an example of and is also referred to herein as special purpose logic), the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
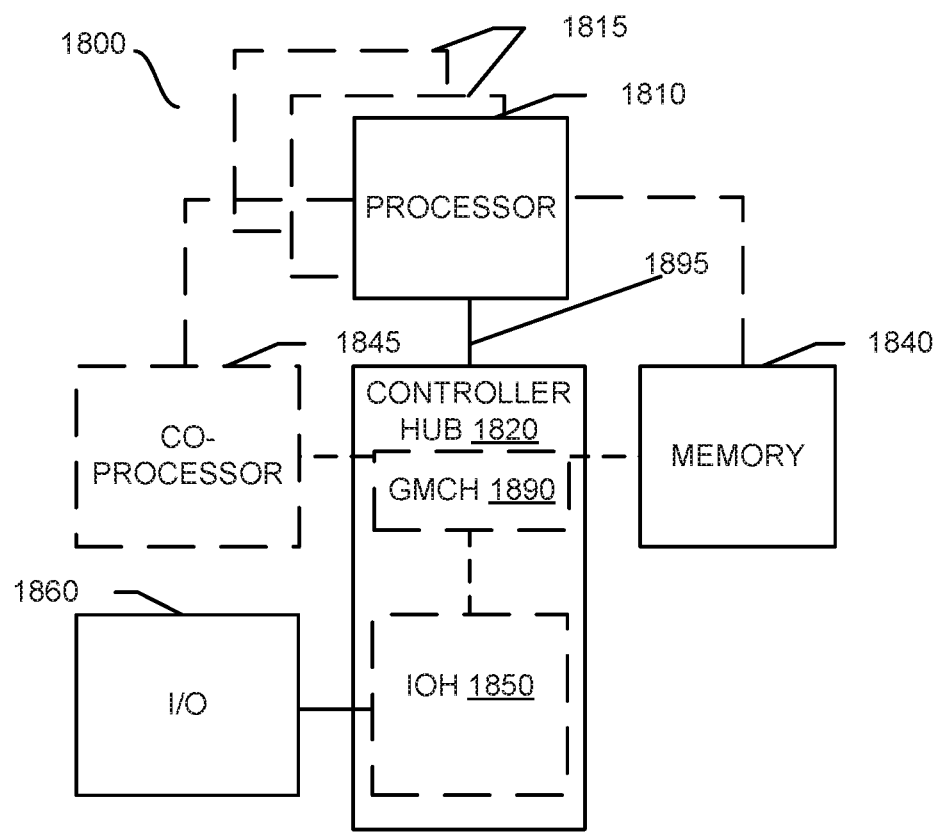
- FIGS. 18-21 are block diagrams of exemplary computer architectures.

Referring now to FIG. 18, shown is a block diagram of a system 1800 in accordance with one embodiment of the present invention. The system 1800 may include one or more processors 1810, 1815, which are coupled to a controller hub 1820. In one embodiment, the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
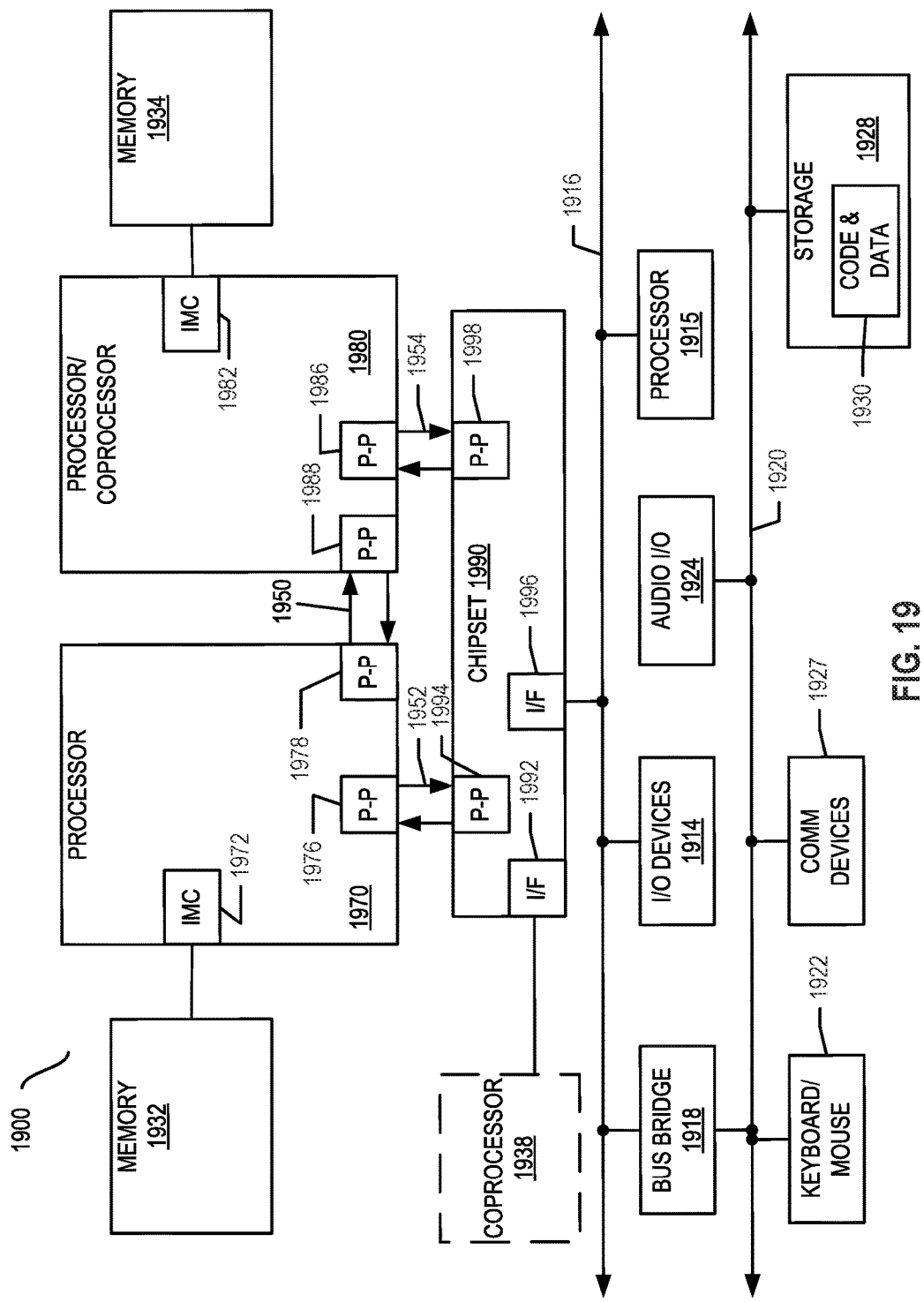

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1992. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
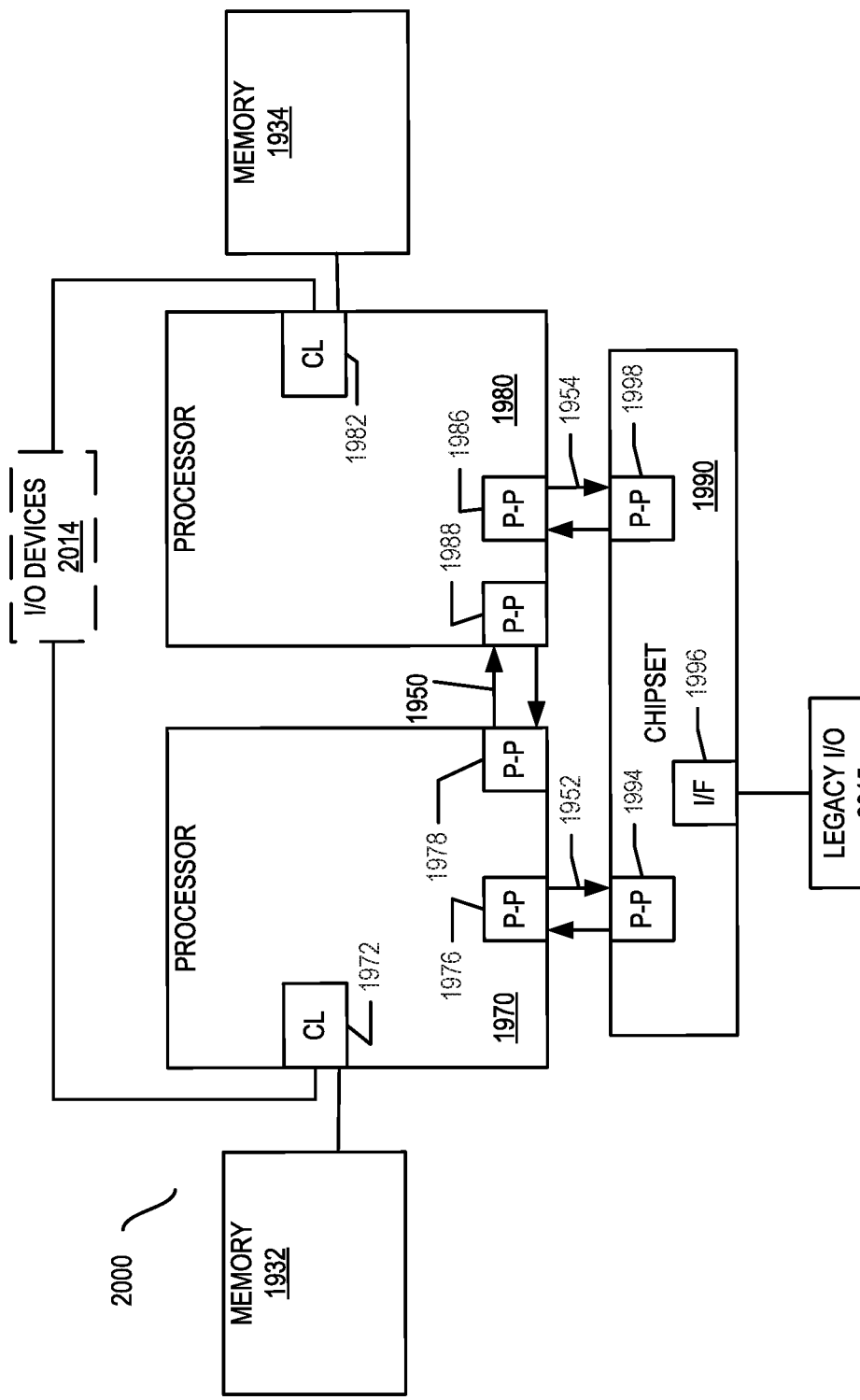

Referring now to FIG. 20, shown is a block diagram of a second more specific exemplary system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
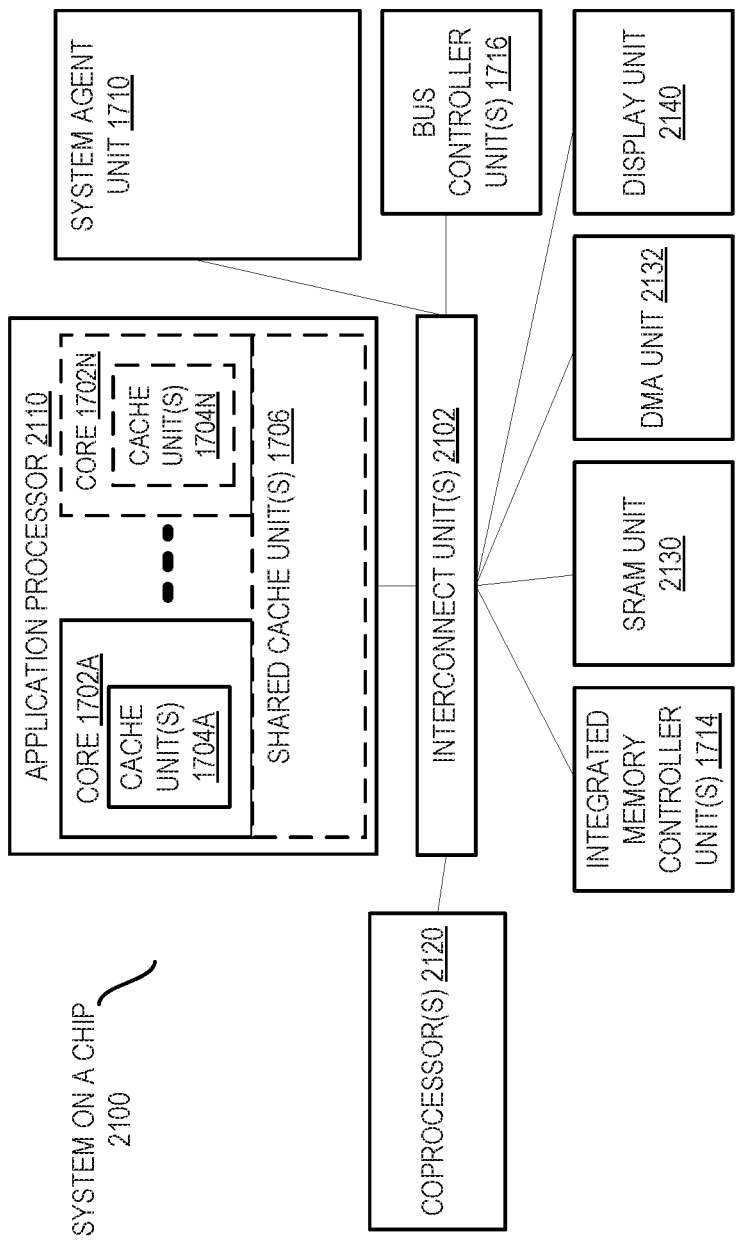

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N, which include cache units 1704A-N, and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
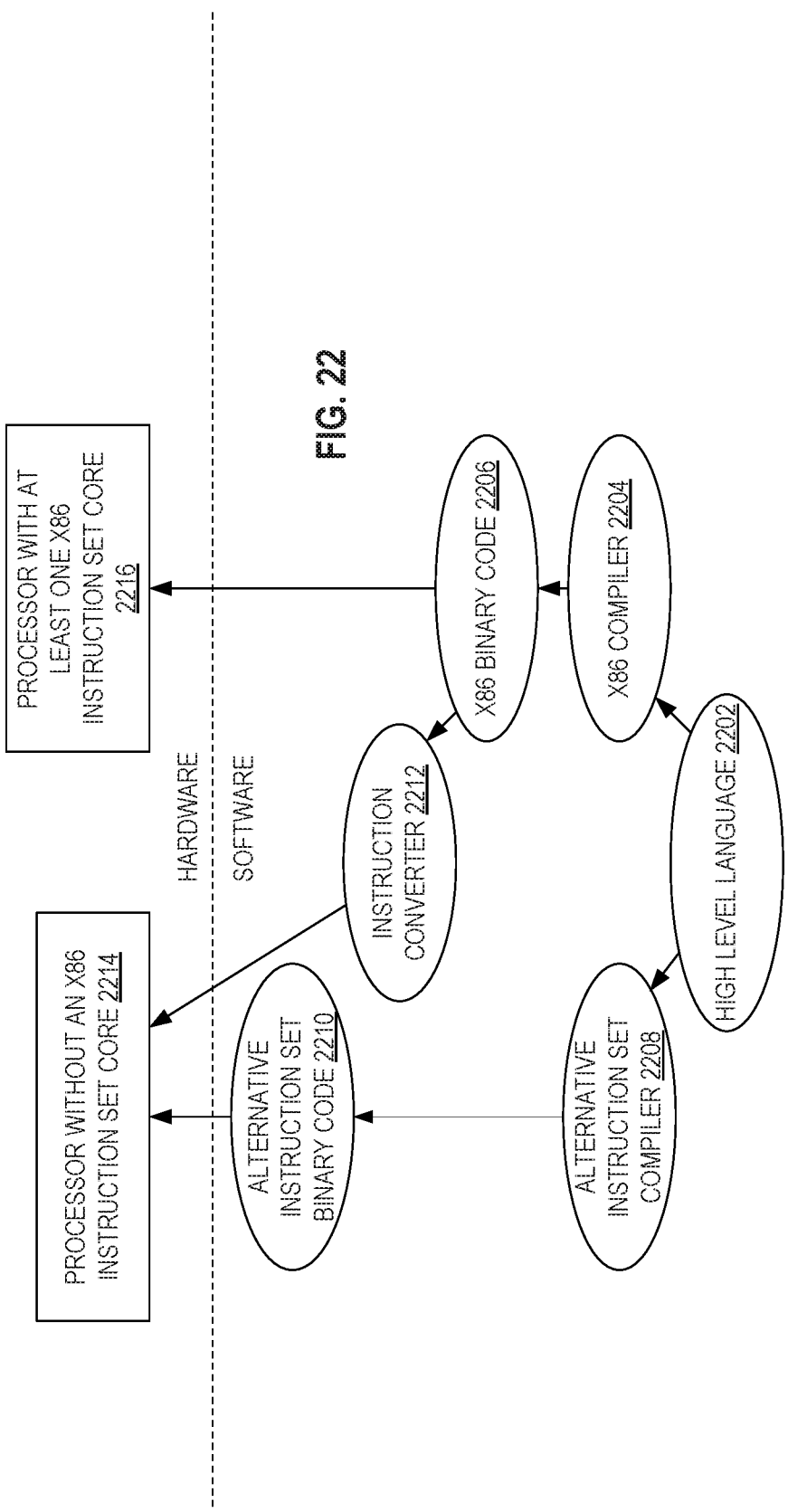
FIG. 22 is a block diagram contrasting the use of a software instruction converter to convert binary instructions in a source instruction set to binary instructions in a target instruction set according to embodiments of the invention.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

FURTHER EXAMPLES

Example 1 provides an exemplary method, performed by a cache control circuit of a requester socket in a multi-socket system, of executing a remote atomic operation (RAO) instruction to a cache line address generated by a requester central processing unit (CPU) core, the method including: receiving the RAO instruction from the requester CPU core, determining a home agent in a home socket for the addressed cache line, providing a request for ownership (RFO) of the addressed cache line to the home agent, waiting for the home agent to either invalidate and retrieve a latest copy of the addressed cache line from a cache, or to fetch the addressed cache line from memory, receiving an acknowledgement and the addressed cache line, executing the RAO instruction on the received cache line atomically, subsequently receiving multiple local RAO instructions to the addressed cache line from one or more requester CPU cores; and executing the multiple local RAO instructions on the received cache line independently of the home agent.

Example 2 includes the substance of the exemplary method of Example 1, wherein the home agent is to service the received RFO request by determining whether the addressed cache line is cached anywhere in the system, and, when the addressed cache line is cached in a local cache hierarchy of the home socket, invalidating and retrieving the addressed cache line from the local cache hierarchy, when the addressed cache line is cached in a remote socket, invalidating and retrieving the addressed cache line from the remote socket, when the addressed cache line is not cached anywhere in the system, fetching the addressed cache line from a virtual memory range mapped to the home socket; and providing the addressed cache line and the acknowledgement to the requester socket.

Example 3 includes the substance of the exemplary method of Example 1, further including the requester socket cache control circuit: receiving a remote request to the addressed cache line while one or more of the multiple local RAO instructions are still pending, the remote request including one of a read request, a read for ownership, and a request for ownership; and arbitrating among the multiple local RAO instructions and the remote request by giving preference to and performing the multiple local RAO instructions first, while taking steps to avoid starving the remote request.

Example 4 includes the substance of the exemplary method of Example 3, wherein taking steps to avoid starving the remote request includes maintaining a count of how many local RAO instructions are executed while the remote request has been pending, and servicing the remote request when the count reaches a threshold.

Example 5 includes the substance of the exemplary method of Example 3, wherein taking steps to avoid starving the remote request includes maintaining a count of how many cycles the remote request has been pending, and servicing the remote request when the count reaches a threshold.

Example 6 includes the substance of the exemplary method of Example 3, wherein each of the multiple local RAO instructions includes a priority operand, and wherein taking steps to avoid starving the remote request includes servicing the remote request when the multiple local RAO instructions each has a low priority.

Example 7 includes the substance of the exemplary method of any one of Examples 1-6, wherein the one or more requester CPU cores are incorporated in the requester socket, wherein the requester socket and the home agent are disposed in first and second sockets, respectively, of a multi-socket system including at least two sockets, and wherein the at least two sockets are coupled with an interconnect including one of a fully-connected topology, a cross-bar topology, a mesh topology, and a ring topology.

Example 8 includes the substance of the exemplary method of any one of Examples 1-6, wherein the home agent includes: a caching agent to keep track of a system-wide cache state of a cache line having an address within a virtual address range mapped to the home agent, the system-wide cache state complying with a cache coherency protocol of the multi-socket system; and a memory agent to interface with and service requests to the memory.

Example 9 includes the substance of the exemplary method of any one of Examples 1-6, wherein determining the home agent includes accessing a mapping, stored in memory, of address ranges to home agents.

Example 10 includes the substance of the exemplary method of any one of Examples 1-6, further including storing the received cache line in a cache hierarchy of the requester socket, the stored cache line to be accessed by the subsequent multiple local RAO instructions.

Example 11 provides an exemplary system for executing a remote atomic operation (RAO) instruction including: a requester socket including a requester cache control circuit and one or more requester CPU cores; wherein the requester cache control circuit is to: receive the RAO instruction to a cache line address from one of the one or more requester CPU cores, determine a home agent in a home socket for the addressed cache line, provide a request for ownership (RFO) of the addressed cache line to the home agent, wait for the home agent to either invalidate and retrieve a latest copy of the addressed cache line from a cache, or to fetch the addressed cache line from memory, receive an acknowledgement and the addressed cache line, execute the RAO instruction on the received cache line atomically, subsequently, receive multiple local RAO instructions to the addressed cache line from the one or more requester CPU cores, and execute the multiple local RAO instructions on the received cache line independently of the home agent.

Example 12 includes the substance of the exemplary system of Example 11, wherein the home agent is to service the received RFO request by determining whether the addressed cache line is cached anywhere in the system, and, when the addressed cache line is cached in a local cache of the home socket, invalidating and retrieving the addressed cache line from the local cache, the local cache including one or more caches shared among the CPU cores in the home socket, and one or more lower-level caches dedicated to individual CPU cores in the home socket, when the addressed cache line is cached in a remote socket, invalidating and retrieving the addressed cache line from the remote socket, when the addressed cache line is not cached anywhere in the system, fetching the addressed cache line from a virtual memory range mapped to the home socket; and providing the addressed cache line and the acknowledgement to the requester socket.

Example 13 includes the substance of the exemplary system of Example 11, wherein the requester cache control circuit is further to: receive a remote request to the addressed cache line while one or more of the multiple local RAO instructions are still pending, the remote request including one of a read request, a read for ownership, and a request for ownership; and arbitrating among the multiple local RAO instructions and the remote request by giving preference to and performing the multiple local RAO instructions first, while taking steps to avoid starving the remote request.

Example 14 includes the substance of the exemplary system of Example 13, wherein taking steps to avoid starving the remote request includes maintaining a count of how many local RAO instructions are executed while the remote request has been pending, and servicing the remote request when the count reaches a threshold.

Example 15 includes the substance of the exemplary system of Example 13, wherein taking steps to avoid starving the remote request includes maintaining a count of how many cycles the remote request has been pending, and servicing the remote request when the count reaches a threshold.

Example 16 includes the substance of the exemplary system of Example 13, wherein each of the multiple local RAO instructions includes a priority operand, and wherein taking steps to avoid starving the remote request includes servicing the remote request when the multiple local RAO instructions each has a low priority.

Example 17 includes the substance of the exemplary system of any one of Examples 11-16, wherein the requester socket and the home agent are disposed in first and second sockets, respectively, of a multi-socket system including at least two sockets, and wherein the at least two sockets are coupled with an interconnect including one of a fully-connected topology, a cross-bar topology, a mesh topology, and a ring topology.

Example 18 includes the substance of the exemplary system of any one of Examples 11-16, wherein determining the home agent includes accessing a mapping, stored in memory, of address ranges to home agents.

Example 19 includes the substance of the exemplary system of any one of Examples 11-16, wherein the home agent includes: a caching agent to keep track of a system-wide cache state of a cache line having an address within a virtual address range mapped to the home agent, the system-wide cache state complying with a cache coherency protocol of the multi-socket system; and a memory agent to interface with and service requests to the memory.

Example 20 includes the substance of the exemplary system of any one of Examples 11-16, wherein the requester cache control circuit is further to store the received cache line in a cache hierarchy of the requester socket, the stored cache line to be accessed by the subsequent multiple local RAO instructions.

Example 21 provides an exemplary apparatus for executing a remote atomic operation (RAO) instruction generated by a requester central processing unit (CPU) core in a requester socket, the apparatus including a cache control circuit in the requester socket, the cache control circuit including: receipt circuitry to receive the RAO instruction from the requester CPU core, means for determining a home agent in a home socket for the addressed cache line, transmit circuitry to provide a request for ownership (RFO) of the addressed cache line to the home agent, means for waiting for the home agent to either invalidate and retrieve a latest copy of the addressed cache line from a cache, or to fetch the addressed cache line from memory, means for receiving an acknowledgement and the addressed cache line, means for executing the RAO instruction on the received cache line atomically; and means for subsequently receiving multiple local RAO instructions to the addressed cache line from one or more requester CPU cores within the requester socket; and means for executing the multiple local RAO instructions on the received cache line independently of the home agent.

Example 22 includes the substance of the exemplary apparatus of Example 21, wherein the home agent is to service the received RFO request by determining whether the addressed cache line is cached anywhere in the apparatus, and, when the addressed cache line is cached in a local cache of the home socket, invalidating and retrieving the addressed cache line from the local cache, the local cache including one or more caches shared among the CPU cores in the home socket, and one or more lower-level caches dedicated to individual CPU cores in the home socket, when the addressed cache line is cached in a remote socket, invalidating and retrieving the addressed cache line from the remote socket, when the addressed cache line is not cached anywhere in the apparatus, fetching the addressed cache line from a virtual memory range mapped to the home socket; and providing the addressed cache line and the acknowledgement to the requester socket.

Example 23 includes the substance of the exemplary apparatus of Example 21, wherein the requester cache control circuit is further to: receive a remote request to the addressed cache line while one or more of the multiple local RAO instructions are still pending, the remote request including one of a read request, a read for ownership, and a request for ownership; and arbitrating among the multiple local RAO instructions and the remote request by giving preference to and performing the multiple local RAO instructions first, while taking steps to avoid starving the remote request.

Example 24 includes the substance of the exemplary apparatus of Example 13, wherein taking steps to avoid starving the remote request includes maintaining a count of how many local RAO instructions are executed while the remote request has been pending, and servicing the remote request when the count reaches a threshold.

Example 25 includes the substance of the exemplary apparatus of Example 13, wherein taking steps to avoid starving the remote request includes maintaining a count of how many cycles the remote request has been pending, and servicing the remote request when the count reaches a threshold.

Example 26 includes the substance of the exemplary apparatus of Example 13, wherein each of the multiple local RAO instructions includes a priority operand, and wherein taking steps to avoid starving the remote request includes servicing the remote request when the multiple local RAO instructions each has a low priority.

Example 27 includes the substance of the exemplary apparatus of any one of Examples 21-26, wherein the requester socket and the home agent are disposed in first and second sockets, respectively, of multiple sockets in the apparatus, the multiple sockets including at least two sockets, and wherein the at least two sockets are coupled with an interconnect including one of a fully-connected topology, a cross-bar topology, a mesh topology, and a ring topology.

Example 28 includes the substance of the exemplary apparatus of any one of Examples 21-26, wherein determining the home agent includes accessing a mapping, stored in memory, of address ranges to home agents.

Example 29 includes the substance of the exemplary apparatus of any one of Examples 21-26, wherein the home agent includes: a caching agent to keep track of an apparatus-wide cache state of a cache line having an address within a virtual address range mapped to the home agent, the apparatus-wide cache state complying with a cache coherency protocol of the multi-socket apparatus; and a memory agent to interface with and service requests to the memory.

Example 30 includes the substance of the exemplary apparatus of any one of Examples 21-26, wherein the requester cache control circuit is further to store the received cache line in a cache hierarchy of the requester socket, the stored cache line to be accessed by the subsequent multiple local RAO instructions.

Example 31 provides an exemplary non-transitory machine-readable medium containing instructions that, when performed by a cache control circuit of a requester socket, cause the cache control circuit to execute a remote atomic operation (RAO) instruction generated by a requester central processing unit (CPU) core within the requester socket by: receiving the RAO instruction from the requester CPU core, determining a home agent in a home socket for the addressed cache line, providing a request for ownership (RFO) of the addressed cache line to the home agent, waiting for the home agent to either invalidate and retrieve a latest copy of the addressed cache line from a cache, or to fetch the addressed cache line from memory, receiving an acknowledgement and the addressed cache line, executing the RAO instruction on the received cache line atomically, subsequently receiving multiple local RAO instructions to the addressed cache line from one or more requester CPU cores within the requester socket, and executing the multiple local RAO instructions on the received cache line independently of the home agent.

Example 32 includes the substance of the exemplary non-transitory machine-readable medium of Example 31, further including instructions that cause the home agent to service the received RFO request by determining whether the addressed cache line is cached anywhere in the system, and, when the addressed cache line is cached in a local cache of the home socket, invalidate and retrieve the addressed cache line from the local cache, the local cache including one or more caches shared among the CPU cores in the home socket, and one or more lower-level caches dedicated to individual CPU cores in the home socket, when the addressed cache line is cached in a remote socket, invalidate and retrieve the addressed cache line from the remote socket, when the addressed cache line is not cached anywhere in the system, fetch the addressed cache line from a virtual memory range mapped to the home socket; and provide the addressed cache line and the acknowledgment to the requester socket.

Example 33 includes the substance of the exemplary non-transitory machine-readable medium of Example 31, further including instructions that cause the requester socket cache control circuit to: receive a remote request to the addressed cache line while one or more of the multiple local RAO instructions are still pending, the remote request including one of a read request, a read for ownership, and a request for ownership; and arbitrate among the multiple local RAO instructions and the remote request by giving preference to and performing the multiple local RAO instructions first, while taking steps to avoid starving the remote request.

Example 34 includes the substance of the exemplary non-transitory machine-readable medium of Example 33, wherein taking steps to avoid starving the remote request includes maintaining a count of how many local RAO instructions are executed while the remote request has been pending, and servicing the remote request when the count reaches a threshold.

Example 35 includes the substance of the exemplary non-transitory machine-readable medium of Example 33, wherein taking steps to avoid starving the remote request includes maintaining a count of how many cycles the remote request has been pending, and servicing the remote request when the count reaches a threshold.

Example 36 includes the substance of the exemplary non-transitory machine-readable medium of Example 33, wherein each of the multiple local RAO instructions includes a priority operand, and wherein taking steps to avoid starving the remote request includes servicing the remote request when the multiple local RAO instructions each has a low priority.

Example 37 includes the substance of the exemplary non-transitory machine-readable medium of any one of Examples 31-36, wherein the requester socket and the home agent are disposed in first and second sockets, respectively, of a multi-socket system including at least two sockets, and wherein the at least two sockets are coupled with an interconnect including one of a fully-connected topology, a cross-bar topology, a mesh topology, and a ring topology.

Example 38 includes the substance of the exemplary non-transitory machine-readable medium of any one of Examples 31-36, wherein determining the home agent includes accessing a mapping, stored in memory, of address ranges to home agents.

Example 39 includes the substance of the exemplary non-transitory machine-readable medium of any one of Examples 31-36, wherein the home agent includes: a caching agent to keep track of a system-wide cache state of a cache line having an address within a virtual address range mapped to the home agent, the system-wide cache state complying with a cache coherency protocol of the multi-socket system; and a memory agent to interface with and service requests to the memory.

Example 40 includes the substance of the exemplary non-transitory machine-readable medium of any one of Examples 31-36, further including instructions that cause the requester cache control circuit to store the received cache line in a cache hierarchy of the requester socket, the stored cache line to be accessed by the subsequent multiple local RAO instructions.

What is claimed is:

1. A method, performed by a cache control circuit of a requester socket in a multi-socket system, of executing a remote atomic operation (RAO) instruction to a cache line address generated by a requester central processing unit (CPU) core, the method comprising:
   receiving the RAO instruction from the requester CPU core;
   determining a home agent in a home socket for the addressed cache line;
   providing a request for ownership (RFO) of the addressed cache line to the home agent;
   waiting for the home agent to either invalidate and retrieve a latest copy of the addressed cache line from a cache, or to fetch the addressed cache line from memory;
   receiving an acknowledgement and the addressed cache line;
   executing the RAO instruction on the received cache line atomically;
   subsequently receiving multiple local RAO instructions to the addressed cache line from one or more requester CPU cores; and
   executing the multiple local RAO instructions on the received cache line independently of the home agent.

2. The method of claim 1, wherein the home agent services the received RFO request by determining whether the addressed cache line is cached anywhere in the system; and
   when the addressed cache line is cached in a local cache hierarchy of the home socket, invalidating and retrieving the addressed cache line from the local cache hierarchy;
   when the addressed cache line is cached in a remote socket, invalidating and retrieving the addressed cache line from the remote socket;
   when the addressed cache line is not cached anywhere in the system, fetching the addressed cache line from a virtual memory range mapped to the home socket; and
   providing the addressed cache line and the acknowledgement to the requester socket.

3. The method of claim 1, further comprising the requester socket cache control circuit:
   receiving a remote request to the addressed cache line while one or more of the multiple local RAO instructions are still pending, the remote request comprising one of a read request, a read for ownership, and a request for ownership; and
   arbitrating among the multiple local RAO instructions and the remote request by giving preference to and performing the multiple local RAO instructions first, while taking steps to avoid starving the remote request.

4. The method of claim 3, wherein taking steps to avoid starving the remote request comprises maintaining a count of how many local RAO instructions are executed while the remote request has been pending, and servicing the remote request when the count reaches a threshold.

5. The method of claim 3, wherein taking steps to avoid starving the remote request comprises maintaining a count of how many cycles the remote request has been pending, and servicing the remote request when the count reaches a threshold.

6. The method of claim 3, wherein each of the multiple local RAO instructions includes a priority operand, and wherein taking steps to avoid starving the remote request comprises servicing the remote request when the multiple local RAO instructions each has a low priority.

7. The method of claim 1, wherein the one or more requester CPU cores are incorporated in the requester socket, wherein the requester socket and the home agent are disposed in first and second sockets, respectively, of a multi-socket system comprising at least two sockets, and wherein the at least two sockets are coupled with an interconnect comprising one of a fully-connected topology, a cross-bar topology, a mesh topology, and a ring topology.

8. The method of claim 1, wherein the home agent comprises:
   a caching agent to keep track of a system-wide cache state of a cache line having an address within a virtual address range mapped to the home agent, the system-wide cache state complying with a cache coherency protocol of the multi-socket system; and
a memory agent to interface with and service requests to the memory.

9. The method of claim 1, wherein determining the home agent comprises accessing a mapping, stored in memory, of address ranges to home agents.

10. The method of claim 1, further comprising storing the received cache line in a cache hierarchy of the requester socket, the stored cache line to be accessed by the subsequent multiple local RAO instructions.

11. A system for executing a remote atomic operation (RAO) instruction comprising:
a requester socket comprising a requester cache control circuit and one or more requester CPU cores, wherein the requester cache control circuit is to:
receive the RAO instruction to a cache line address from one of the one or more requester CPU cores;
determine a home agent in a home socket for the addressed cache line;
provide a request for ownership (RFO) of the addressed cache line to the home agent;
wait for the home agent to either invalidate and retrieve a latest copy of the addressed cache line from a cache, or to fetch the addressed cache line from memory;
receive an acknowledgement and the addressed cache line;
execute the RAO instruction on the received cache line atomically;
subsequently, receive multiple local RAO instructions to the addressed cache line from the one or more requester CPU cores; and
execute the multiple local RAO instructions on the received cache line independently of the home agent.

12. The system of claim 11, wherein the home agent is to service the received RFO request by determining whether the addressed cache line is cached anywhere in the system; and
when the addressed cache line is cached in a local cache of the home socket, invalidating and retrieving the addressed cache line from the local cache, the local cache comprising one or more caches shared among the CPU cores in the home socket, and one or more lower-level caches dedicated to individual CPU cores in the home socket;
when the addressed cache line is cached in a remote socket, invalidating and retrieving the addressed cache line from the remote socket;
when the addressed cache line is not cached anywhere in the system, fetching the addressed cache line from a virtual memory range mapped to the home socket; and
providing the addressed cache line and the acknowledgement to the requester socket.

13. The system of claim 11, wherein the requester cache control circuit is further to:
receive a remote request to the addressed cache line while one or more of the multiple local RAO instructions are still pending, the remote request comprising one of a read request, a read for ownership, and a request for ownership; and
arbitrate among the multiple local RAO instructions and the remote request by giving preference to and performing the multiple local RAO instructions first, while taking steps to avoid starving the remote request.

14. The system of claim 13, wherein taking steps to avoid starving the remote request comprises one or more of:
maintaining a count of how many local RAO instructions are executed while the remote request has been pending, and servicing the remote request when the count reaches a threshold;
maintaining a count of how many cycles the remote request has been pending, and servicing the remote request when the count reaches a threshold; and
servicing the remote request when the multiple local RAO instructions each has a low priority, wherein each of the multiple local RAO instructions includes a priority operand.

15. The system of claim 11, wherein the requester socket and the home agent are disposed in first and second sockets, respectively, of a multi-socket system comprising at least two sockets, and wherein the at least two sockets are coupled with an interconnect comprising one of a fully-connected topology, a cross-bar topology, a mesh topology, and a ring topology.

16. The system of claim 11, wherein determining the home agent comprises accessing a mapping, stored in memory, of address ranges to home agents.

17. The system of claim 11, wherein the home agent comprises:
a caching agent to keep track of a system-wide cache state of a cache line having an address within a virtual address range mapped to the home agent, the system-wide cache state complying with a cache coherency protocol of the multi-socket system; and
a memory agent to interface with and service requests to the memory.

18. The system of claim 11, wherein the requester cache control circuit is further to store the received cache line in a cache hierarchy of the requester socket, the stored cache line to be accessed by the subsequent multiple local RAO instructions.

19. An apparatus for executing a remote atomic operation (RAO) instruction generated by a requester central processing unit (CPU) core in a requester socket, the apparatus comprising a cache control circuit in the requester socket, the cache control circuit comprising:
receipt circuitry to receive the RAO instruction from the requester CPU core;
means for determining a home agent in a home socket for the addressed cache line;
transmit circuitry to provide a request for ownership (RFO) of the addressed cache line to the home agent;
means for waiting for the home agent to either invalidate and retrieve a latest copy of the addressed cache line from a cache, or to fetch the addressed cache line from memory;
means for receiving an acknowledgement and the addressed cache line;
means for executing the RAO instruction on the received cache line atomically;
means for subsequently receiving multiple local RAO instructions to the addressed cache line from one or more requester CPU cores within the requester socket; and
means for executing the multiple local RAO instructions on the received cache line independently of the home agent.

20. The apparatus of claim 19, wherein the home agent is to service the received RFO request by determining whether the addressed cache line is cached anywhere in the apparatus; and when the addressed cache line is cached in a local cache of the home socket, invalidating and retrieving the addressed cache line from the local cache, the local cache comprising one or more caches shared among the CPU cores in the home socket, and one or more lower-level caches dedicated to individual CPU cores in the home socket;

when the addressed cache line is cached in a remote socket, invalidating and retrieving the addressed cache line from the remote socket;

when the addressed cache line is not cached anywhere in the apparatus, fetching the addressed cache line from a virtual memory range mapped to the home socket; and providing the addressed cache line and the acknowledgement to the requester socket.

21. The apparatus of claim 19, wherein the requester cache control circuit is further to:

receive a remote request to the addressed cache line while one or more of the multiple local RAO instructions are still pending, the remote request comprising one of a read request, a read for ownership, and a request for ownership; and arbitrating among the multiple local RAO instructions and the remote request by giving preference to and performing the multiple local RAO instructions first, while taking steps to avoid starving the remote request.

22. A non-transitory machine-readable medium containing instructions that, when performed by a cache control circuit of a requester socket, cause the cache control circuit to execute a remote atomic operation (RAO) instruction generated by a requester central processing unit (CPU) core within the requester socket by:

receiving the RAO instruction from the requester CPU core;

determining a home agent in a home socket for the addressed cache line;

providing a request for ownership (RFO) of the addressed cache line to the home agent;

waiting for the home agent to either invalidate and retrieve a latest copy of the addressed cache line from a cache, or to fetch the addressed cache line from memory;

receiving an acknowledgement and the addressed cache line;

executing the RAO instruction on the received cache line atomically;

subsequently receiving multiple local RAO instructions to the addressed cache line from one or more requester CPU cores within the requester socket, and executing the multiple local RAO instructions on the received cache line independently of the home agent.

23. The non-transitory machine-readable medium of claim 22, further including instructions that cause the home agent to:

service the received RFO request by determining whether the addressed cache line is cached anywhere in a multi-socket system in which the home socket is disposed;

when the addressed cache line is cached in a local cache of the home socket, invalidate and retrieve the addressed cache line from the local cache, the local cache comprising one or more caches shared among the CPU cores in the home socket, and one or more lower-level caches dedicated to individual CPU cores in the home socket;

when the addressed cache line is cached in a remote socket, invalidate and retrieve the addressed cache line from the remote socket;

when the addressed cache line is not cached anywhere in the system, fetch the addressed cache line from a virtual memory range mapped to the home socket; and provide the addressed cache line and the acknowledgement to the requester socket.

24. The non-transitory machine-readable medium of claim 22, further comprising instructions that cause the requester socket cache control circuit to:

receive a remote request to the addressed cache line while one or more of the multiple local RAO instructions are still pending, the remote request comprising one of a read request, a read for ownership, and a request for ownership; and arbitrate among the multiple local RAO instructions and the remote request by giving preference to and performing the multiple local RAO instructions first, while taking steps to avoid starving the remote request.

25. The non-transitory machine-readable medium of claim 24, wherein taking steps to avoid starving the remote request comprises one or more of:

maintaining a count of how many local RAO instructions are executed while the remote request has been pending, and servicing the remote request when the count reaches a threshold;

maintaining a count of how many cycles the remote request has been pending, and servicing the remote request when the count reaches a threshold; and servicing the remote request when the multiple local RAO instructions each has a low priority, wherein each of the multiple local RAO instructions includes a priority operand.

* * * * *